United States Patent
Wang et al.

(10) Patent No.: US 10,828,663 B2
(45) Date of Patent: Nov. 10, 2020

(54) CONDUCTIVE FIBER COMPOSITES CONTAINING MULTI-SCALE HIGH CONDUCTIVE PARTICLES AND METHODS

(71) Applicant: Florida State University Research Foundation, Inc., Tallahassee, FL (US)

(72) Inventors: Shaokai Wang, Tallahassee, FL (US); Zhiyong (Richard) Liang, Tallahassee, FL (US)

(73) Assignee: Florida State University Research Foundation, Inc., Tallahassee, FL (US)

( * ) Notice: Subject to any disclaimer, the term of this patent is extended or adjusted under 35 U.S.C. 154(b) by 0 days.

(21) Appl. No.: 15/886,139

(22) Filed: Feb. 1, 2018

(65) Prior Publication Data
US 2018/0216284 A1 Aug. 2, 2018

Related U.S. Application Data

(62) Division of application No. 14/456,889, filed on Aug. 11, 2014, now abandoned.
(Continued)

(51) Int. Cl.
*B05D 1/12* (2006.01)
*D06M 11/83* (2006.01)
(Continued)

(52) U.S. Cl.
CPC .............. *B05D 1/12* (2013.01); *B32B 1/00* (2013.01); *B32B 5/022* (2013.01); *B32B 5/024* (2013.01); *B32B 5/26* (2013.01); *C08J 5/042* (2013.01); *C08J 5/06* (2013.01); *C08J 5/10* (2013.01); *D06M 11/83* (2013.01); *D06M 23/08* (2013.01); *H01B 1/22* (2013.01); *B32B 2250/20* (2013.01); *B32B 2260/023* (2013.01);
(Continued)

(58) Field of Classification Search
None
See application file for complete search history.

(56) References Cited

U.S. PATENT DOCUMENTS

2008/0246007 A1* 10/2008 Gellrich ............... B05D 3/0254
252/500
2008/0286488 A1* 11/2008 Li ......................... B22F 1/0074
427/541

(Continued)

OTHER PUBLICATIONS

Han et al., "Increasing the through-thickness thermal conductivity of carbon fiber polymer-matrix composite by curing pressure increase and filler incorporation," Composites Science and Technology 71(16) (2011): 1944-1952.

(Continued)

*Primary Examiner* — Michael P. Rodriguez
(74) *Attorney, Agent, or Firm* — Eversheds Sutherland (US) LLP

(57) ABSTRACT

Composite materials are provided that include a host material, nanoscale high conductive particles, and microscale high conductive particles. The nanoscale high conductive particles and the microscale high conductive particles may increase the through thickness thermal conductivity of the composite material by at least 4.0 W/(m·K), as compared to the same composite material without the nanoscale high conductive particles and microscale high conductive particles. Methods for making the composite materials herein also are provided.

18 Claims, 15 Drawing Sheets

Related U.S. Application Data

(60) Provisional application No. 61/864,078, filed on Aug. 9, 2013.

(51) Int. Cl.
| | |
|---|---|
| *H01B 1/22* | (2006.01) |
| *D06M 23/08* | (2006.01) |
| *B32B 5/26* | (2006.01) |
| *B32B 5/02* | (2006.01) |
| *C08J 5/10* | (2006.01) |
| *C08J 5/06* | (2006.01) |
| *B32B 1/00* | (2006.01) |
| *C08J 5/04* | (2006.01) |
| *D06M 101/40* | (2006.01) |

(52) U.S. Cl.
CPC ... *B32B 2260/046* (2013.01); *B32B 2262/106* (2013.01); *B32B 2264/105* (2013.01); *B32B 2307/30* (2013.01); *B32B 2307/302* (2013.01); *B32B 2307/54* (2013.01); *B32B 2307/72* (2013.01); *B32B 2307/732* (2013.01); *B32B 2571/02* (2013.01); *B32B 2605/18* (2013.01); *D06M 2101/40* (2013.01)

(56) References Cited

U.S. PATENT DOCUMENTS

| | | | |
|---|---|---|---|
| 2010/0134946 A1* | 6/2010 | Narasimalu | H02G 13/00 361/225 |
| 2010/0178487 A1 | 7/2010 | Aral | |
| 2011/0293437 A1* | 12/2011 | Krug | F03D 1/0675 416/241 A |
| 2014/0308460 A1* | 10/2014 | Uchida | H05K 3/105 427/557 |

OTHER PUBLICATIONS

Zimmer et al., "Through-thickness thermal conductivity prediction study on nanocomposites and multiscale composites," Materials Sciences and Applications, 3 (2012): 131-138.

* cited by examiner

CONDUCTIVE FIBER COMPOSITES CONTAINING MULTI-SCALE HIGH CONDUCTIVE PARTICLES AND METHODS

CROSS-REFERENCE TO RELATED APPLICATION

This application is a divisional of U.S. patent application Ser. No. 14/456,889, filed Aug. 11, 2014, which claims priority to U.S. Provisional Patent Application No. 61/864,078, filed Aug. 9, 2013. The content of these applications is incorporated herein by reference.

STATEMENT REGARDING FEDERALLY SPONSORED RESEARCH OR DEVELOPMENT

This invention was made with U.S. government support under contract no. FA9550-11-C-0081 awarded by the Air Force Office of Scientific Research. The U.S. government has certain rights in the invention.

BACKGROUND

The through-thickness thermal conductivity (TTTC) of laminated composites is an important characteristic, especially when the laminated composites must demonstrate thermal management functions in high-performance composite structures.

Advanced composite materials have been widely used as structural materials for aerospace, military, and industrial applications, mainly due to their high stiffness and strength-to-weight ratios. Currently, the low thermal conductivity of many composites restricts the composites' ability to replace metallic structures where thermal management is required.

As a result, many composite materials cannot be used in certain applications that require adequate thermal management, such as supersonic aircraft wings, gas turbine engines, lightweight heat exchangers, electronics packaging materials, hydraulic pump enclosures, and electromagnetic interference (EMI) enclosures. In many applications, internal heat must be effectively dissipated, and a high TTTC is an important feature that should be present when an advanced composite material is used in these applications.

Carbon fiber is a widely used reinforcement in advanced polymer composites, mainly due to its superior mechanical and physical properties. Polyacrylonitrile (PAN)-based fiber and pitch-based fiber are two of the most commonly used types of carbon fiber. These two types of fiber, however, have different mechanical and thermal properties, which can impact the performance of resulting composite materials. PAN fibers typically possess high strength and relatively low modulus, while pitch-based fibers typically have higher modulus and lower tensile strength. Pitch-based fibers typically have higher thermal conductivity properties than PAN-based fibers, likely due to the higher graphitization degree of pitch-based fibers.

For both types of carbon fibers, however, the thermal conductivity is higher in the axial direction, likely due to long and continuous crystal structures oriented in the fiber axis direction, which probably promote phonon transportation. As a result, the in-plane thermal conductivity of laminated composites typically is higher along the fiber axial direction and lower along the through-thickness directions transverse to the fiber axis. The absence of fibers in the through-thickness direction, and insulating resin rich areas between fiber tows and layers, may contribute to the low TTTC.

Silver particles, copper particles, carbon black, carbon nanotubes, and aluminum powder have been tested to improve the thermal conductivity of polymer resins, and some also have been applied in the fiber reinforced composite materials as fillers in a matrix. The TTTCs of the carbon fiber composites produced with these fillers, however, were usually no more than 3.0 W/(m K). According to the relevant literature, interlaminar resin-rich layers may cause the above-described low TTTC.

The TTTCs of composite materials, however, must be improved in order to use the composite materials in many high performance applications. Therefore, enhancing the TTTC of widely used laminated composites is highly desired.

BRIEF SUMMARY

Composite materials are provided that comprise a host material, nanoscale high conductive particles, and microscale high conductive particles. The combined use of nanoscale high conductive particles and microscale high conductive particles advantageously contributes to the formation of conductive paths in the through-thickness direction of the composite materials. In embodiments, the nanoscale high conductive particles and the microscale high conductive particles are present in a total amount of at least 0.5 volume % of the composite material. In some embodiments, the nanoscale high conductive particles and the microscale high conductive particles increase the TTTC of the composite material by at least 4.0 W/(m·K), as compared to the same composite material without the nanoscale high conductive particles and microscale high conductive particles. The host material, in particular embodiments, comprises a woven or non-woven fabric, for example, a carbon fabric. The host material, in particular embodiments, comprises two or more layers of at least one of a woven or non-woven fabric.

Methods for making the composite materials herein also are provided. In embodiments, the methods comprise providing a host material, and contacting the host material with microscale high conductive particles and nanoscale high conductive particles to associate the host material with an amount of the microscale high conductive particles and the nanoscale high conductive particles sufficient to impart the composite material with at least a 0.4 volume % of high conductive particles. In some embodiments, the methods further comprise forming a suspension of at least one of the microscale high conductive particles and the nanoscale high conductive particles in a liquid prior to contacting the host material with the microscale high conductive particles and nanoscale high conductive particles. In other embodiments, the methods further comprise mixing the suspension with a resin prior to contacting the host material.

Additional composite materials are provided that comprise one or more fabric sheets, a resin reinforcing the one or more fabric sheets, and nanoscale metallic particles and microscale metallic particles distributed through the one or more fabric sheets and the resin in an amount and locations effective to form continuous through-thickness conductive paths through the composite material that increase the TTTC of the composite material by at least 4.0 W/(m·K), as compared to the same composite material without the nanoscale metallic particles and microscale metallic particles. The metallic particles, in some embodiments, are silver particles, copper particles, or aluminum particles. In particular embodiments, the metallic particles are sintered.

BRIEF DESCRIPTION OF THE FIGURES

FIG. 5A-1 depicts the cross-sectional morphology of IM7 PAN-based carbon fibers.

FIG. 5A-2 depicts the cross-sectional morphology of IM7 PAN-based carbon fibers at different magnification.

FIG. 5B-1 depicts the cross-sectional morphology of EWC300 pitch-based carbon fibers.

FIG. 5B-2 depicts the cross-sectional morphology of EWC300 pitch-based carbon fibers at different magnification.

DETAILED DESCRIPTION

This disclosure provides composite materials and methods for making composite materials having improved through-thickness thermal conductivity (TTTC). Generally, the composite materials comprise a host material, nanoscale high conductive particles, and microscale high conductive particles.

Figure 1:
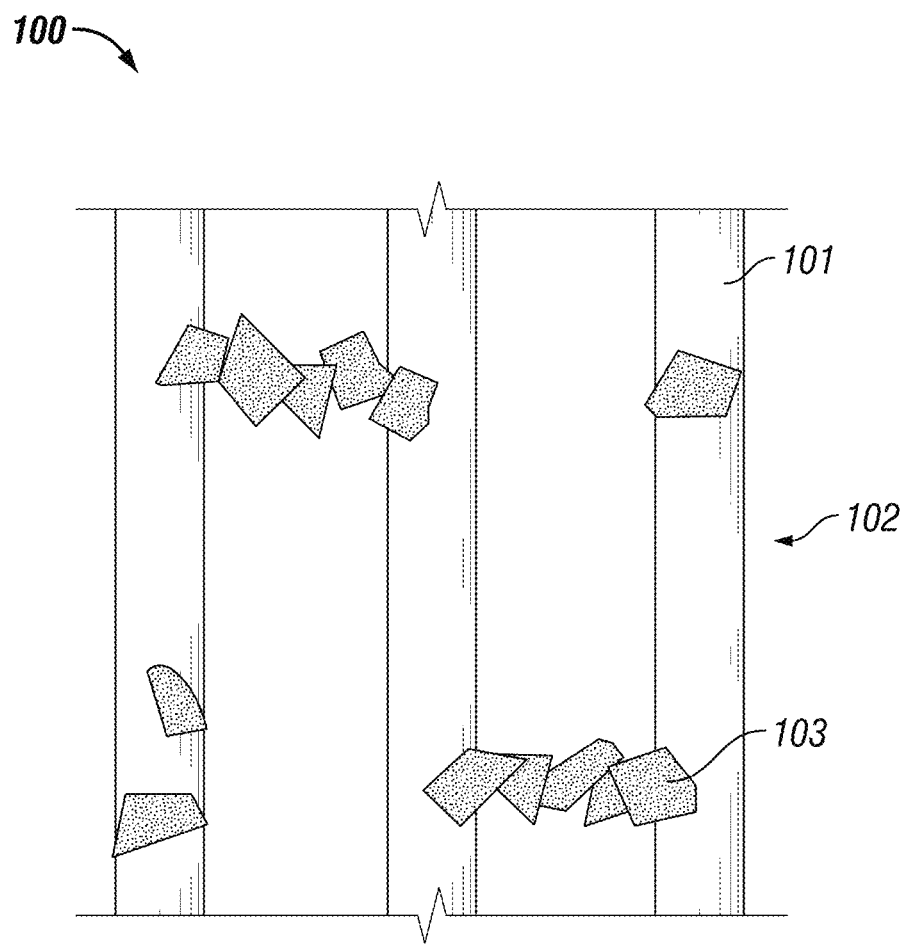
FIG. 1 is a schematic of one embodiment of a composite material, which includes a carbon fiber fabric, silver particles, and a resin.

Not wishing to be bound by any particular theory, it is believed that the combination of nanoscale high conductive particles and microscale high conductive particles provides a size synergy advantage that improves the TTTC of the composite materials. The combination of nanoscale high conductive particles and microscale high conductive particles may provide heterogeneously structured continuous through-thickness thermal conducting paths in the composite materials, as shown at FIG. 1. FIG. 1 is a schematic of a composite material 100 comprising a carbon fabric of carbon fibers 101, a resin 102, and silver particles 103, which form a heterogeneously structured conductive path of silver.

High Conductive Particles

Generally, the nanoscale high conductive particles and the microscale high conductive particles may be particles of any conductive metal or metals. Particles of any metal having a relatively high thermal conductivity may be used. In embodiments, the nanoscale high conductive particles and microscale high conductive particles are particles of the same conductive metal. In other embodiments, the nanoscale high conductive particles and microscale high conductive particles are particles of different conductive metals.

In embodiments, the nanoscale high conductive particles and the microscale high conductive particles comprise silver, copper, aluminum, or a combination thereof. In one embodiment, the nanoscale high conductive particles are nanoscale silver particles, and the microscale high conductive particles are microscale silver particles.

The nanoscale high conductive particles and microscale high conductive particles may be in any shape. The shape of the nanoscale high conductive particles and microscale high conductive particles may be the same or different. The nanoscale high conductive particles and the microscale high conductive particles may be substantially spherical, flake shaped, or a combination thereof. In one embodiment, the nanoscale high conductive particles are substantially spherical, and the microscale high conductive particles are flake shaped. In another embodiment, the nanoscale high conductive particles are flake shaped, and the microscale high conductive particles are substantially spherical. In yet another embodiment, both the nanoscale high conductive particles and the microscale high conductive particles are flaked shaped.

In embodiments, the microscale high conductive particles have an average diameter of from about 1 micrometer to about 20 micrometers. In further embodiments, the microscale high conductive particles have an average diameter of from about 5 micrometers to about 15 micrometers.

In embodiments, the nanoscale high conductive particles have an average diameter of from about 10 nm to about 50 nm. In further embodiments, the nanoscale high conductive particles have an average diameter of from about 20 nm to about 40 nm.

As used herein, the phrase "average diameter" is not intended to convey that the particles are necessarily substantially spherical. The phrase "average diameter", as used herein, is intended to relate to the average largest dimension of the particles. When the particles are substantially spherical, the phrase relates to the diameter. When the particles are flake shaped, the phrase relates to the largest dimension across the face of the flake.

In embodiments, at least one of the nanoscale high conductive particles and microscale high conductive particles are sintered. The high conductive particles may sinter at moderate temperatures. Not wishing to be bound by any particular theory, it is believed that the sintering of high conductive metallic particles at moderate temperatures may establish better continuous conduction paths, which improves the TTTC of the composite materials provided herein.

Host Materials

Generally, the nanoscale high conductive particles and microscale high conductive particles may be added to any compatible host material. The host material, in one embodiment, is a woven fabric. The host material, in another embodiment, is a non-woven fabric. The host material, in yet another embodiment, includes a woven fabric and a non-woven fabric.

In embodiments, the woven or non-woven fabric is a carbon fabric, i.e., a fabric of carbon fibers. The carbon fibers, in certain embodiments, include carbon nanotubes, carbon nanofibers, or a combination thereof. The carbon nanotubes can include single-walled nanotubes, multi-walled nanotubes, carbon nanofibers, or a combination thereof. In one embodiment, the host material comprises a buckypaper. A number of commercially available materials may be used as a host material or part of a host material, including EWC300X (Cytec Industries, Inc.), EWC600X (Cytec Industries, Inc.), YS95A (Nippon), K13C (Misubishi), IM7 (Hexeel), or a combination thereof.

The host materials may be reinforced. For example, the host materials may be reinforced by one or more resins, such as an epoxy resin. In some embodiments, the composite materials contain two or more resins.

Composite Materials

The composite materials provided herein generally comprise a host material, microscale high conductive particles, and nanoscale high conductive particles. In embodiments, the weight ratio of nanoscale high conductive particles to microscale high conductive particles is from about 1:1 to about 1:3. In other embodiments, the weight ratio of nanoscale high conductive particles to microscale high conductive particles is from about 1:1 to about 1:2. In one embodiment, the weight ratio of nanoscale high conductive particles to microscale high conductive particles is about 1:1.

Not wishing to be bound by any particular theory, it is believed that the combination of nanoscale high conductive particles and microscale high conductive particles provides, at least in some embodiments, continuous through-thickness conduction paths in the host materials. For example, in embodiments in which the host material includes a woven or non-woven fabric and a resin, the combination of microscale high conductive particles and nanoscale high conductive particles may penetrate fiber tows and bridge large inter-tow resin rich areas of the composite materials.

Generally, the microscale high conductive particles and nanoscale high conductive particles are associated with the host material. In one embodiment, the microscale high conductive particles and nanoscale high conductive particles impregnate the host material. As used herein, the term "impregnate" means that at least a portion of the high conductive particles substantially penetrates, and is dispersed in, the host material.

In some embodiments, the high conductive particles are dispersed evenly throughout the composite material. In other embodiments, the high conductive particles are dispersed unevenly throughout the composite material. In one embodiment, the microscale high conductive particles are dispersed evenly throughout the composite material, and the nanoscale high conductive particles are dispersed unevenly throughout the composite material. In another embodiment, the microscale high conductive particles are dispersed unevenly throughout the composite material, and the nanoscale high conductive particles are dispersed evenly throughout the composite material.

In particular embodiments, the composite material comprises a woven or non-woven fabric and a resin, and the nanoscale high conductive particles penetrate the fiber tows and deposit on the surfaces of the fibers of the fabrics, thereby likely enhancing the thermal conductivity within the fiber tows; and the microscale high conductive particles are mainly distributed in the resin rich areas between fiber tows, which may construct inter-tow conductive paths across the large resin rich areas. It was discovered that, at least in some embodiments, the presence of microscale high conductive particles in resin rich areas demonstrated little impact on tensile performance of the composite materials. In particular embodiments, the presence of microscale high conductive particles in resin rich areas demonstrated less impact on tensile performance than nanoscale particles applied directly on fiber surfaces.

In one embodiment, the presence of nanoscale high conductive particles and microscale high conductive particles improves the TTTC of the composite materials compared to the same composite materials or host materials without the high conductive particles by at least 4.0 W/(m·K). In another embodiment, the TTTC was improved by at least 5.0 W/(m·K). In yet another embodiment, the TTTC was improved by at least 6.0 W/(m·K). In a particular embodiment, the TTTC was improved by at least 7.0 W/(m·K). In a still further embodiment, the TTTC was improved by at least 8.0 W/(m·K). In an additional embodiment, the TTTC was improved by at least 9.0 W/(m·K). In a certain embodiment, the TTTC was improved by at least 10.0 W/(m·K).

In one embodiment, the composite materials have a thermal conductivity of at least 20 W/(m·K). In another embodiment, the composite materials have a thermal conductivity of at least 25 W/(m·K). In a further embodiment, the composite materials have a thermal conductivity of at least 30 W/(m·K). In yet another embodiment, the composite materials have a thermal conductivity of at least 40 W/(m·K).

In embodiments, the high conductive particles are present in the composite materials in an amount effective to impart a high conductive metal volume fraction of at least 0.5 volume %. In one embodiment, the high conductive metal volume fraction is at least 1.0 volume %. In another embodiment, the high conductive metal volume fraction is at least 1.5 volume %. In a further embodiment, the high conductive metal volume fraction is at least 2.0 volume %. In an additional embodiment, the high conductive metal volume fraction is at least 2.5 volume %. In a certain embodiment, the high conductive metal volume fraction is at least 3.0 volume %. In a particular embodiment, the high conductive metal volume fraction is at least 3.5 volume %. In yet another embodiment, the high conductive metal volume fraction is at least 4.0 volume %. In a still further embodiment, the high conductive metal volume fraction is at least 4.5 volume %. In some embodiments, the high conductive metal volume fraction is at least 5.0 volume %. In certain embodiments, the high conductive metal volume fraction is at least 5.5 volume %. In particular embodiments, the high conductive metal volume fraction is at least 6.0 volume %. In additional embodiments, the high conductive metal volume fraction is at least 6.5 volume %. In an embodiment, the high conductive metal volume fraction is at least 7.0 volume %. In other embodiments, the high conductive metal volume fraction is at least 7.5 volume %. In several embodiments, the high conductive metal volume fraction is at least 8.0 volume %. In other additional embodiments, the high conductive metal volume fraction is at least 8.5 volume %. In other particular embodiments, the high conductive metal volume fraction is at least 9.0 volume %. In other certain embodiments, the high conductive metal volume fraction is at least 9.5 volume %. In further particular embodiments, the high conductive metal volume fraction is at least 10.0 volume %. In further certain embodiments, the high conductive metal volume fraction is at least 10.5 volume %. In further additional embodiments, the high conductive metal volume fraction is at least 11 volume %. In further certain embodiments, the high conductive metal volume fraction is at least 11.5 volume %. In a further additional embodiment, the high conductive metal volume fraction is at least 12 volume %. In a further certain embodiment, the high conductive metal volume fraction is at least 12.5 volume %. In a further particular embodiment, the high conductive metal volume fraction is at least 13 volume %. In a further other embodiment, the high conductive metal volume fraction is at least 13.5 volume %. In a further additional embodiment, the high conductive metal volume fraction is at least 14.0 volume %. In a further another embodiment, the high conductive metal volume fraction is at least 14.5 volume %. In another further embodiment, the high conductive metal volume fraction is or at least 15.0 volume %.

In one embodiment, the composite material comprises an amount of nanoscale silver particles and microscale silver particles effective to impart the composite material with a silver volume fraction of 5.1 volume %, and an improvement of TTTC of 6.62 W/(m·K).

In embodiments, the host material of the composite materials provided herein comprises at least one of a woven or non-woven fabric, and the composite materials comprise two or more fabric sheets. In some embodiments, the composite materials may include two or more layers of fabrics, which may be stacked on top of each other. In one embodiment, the composite materials comprise two woven fabrics stacked on top of each other. In another embodiment, the composite materials comprise two non-woven fabrics stacked on top of each other. In yet another embodiment, the composite materials comprise a non-woven fabric and a woven fabric stacked on top of each other.

Methods of Making Composite Materials

Generally, the composite materials provided herein may be formed by contacting a host material with nanoscale high conductive particles and microscale high conductive particles. In one embodiment, the composite materials are formed by providing a woven or non-woven fabric, and contacting the woven or non-woven fabric with microscale high conductive particles and nanoscale high conductive particles. By contacting the host material with the high conductive particles, the high conductive particles are associated with the host material. For example, the high conductive particles and host material can be secured together by the contacting step. As another example, the high conductive particles can impregnate the host material during the contacting step. The methods provided herein generally are scalable and may be used to make composite materials of a desired size.

A suspension of high conductive particles may be used to assist in contacting a host material with the high conductive particles. In one embodiment, the suspension includes the nanoscale high conductive particles and the microscale high conductive particles. In another embodiment, two suspensions are prepared; the first including the nanoscale high conductive particles, and the second including the microscale high conductive particles. Therefore, the microscale high conductive particles and nanoscale high conductive particles may contact the host material together or subsequently, in any order, via a suspension.

The suspensions of high conductive particles may be formed with any compatible liquid (e.g., a non-solvent for the particles). In one embodiment, the suspension is formed with a liquid that is easily removable by means known in the art. For example, the liquid may be easily removable by volitization. The liquid may be selected from acetone, DMF, alcohol, or a combination thereof. The alcohol may be ethanol.

In one embodiment, the composite materials provided herein are made by contacting a host material with a suspension including microscale high conductive particles and nanoscale high conductive particles, and then removing the suspension liquid. In another embodiment, the composite materials provided herein are made by contacting a host material with a first suspension of microscale high conductive particles, removing the suspension liquid of the first suspension, contacting the host material with a second suspension of nanoscale high conductive particles, and removing the suspension liquid of the second suspension. In yet another embodiment, the composite materials provided herein are made by contacting a host material with a first suspension of nanoscale high conductive particles, removing the suspension liquid of the first suspension, contacting the host material with a second suspension of microscale high conductive particles, and removing the suspension liquid of the second suspension.

The suspension may include one or more additives. The one or more additives may assist in the formation of the suspension. Alternatively or additionally, the one or more additives may lend one or more desirable characteristics to the composite materials. For example, the one or more additives may include at least one resin, at least one filler, or a combination thereof. The resin, in one embodiment, is an epoxy resin. The filler material may be any material that is compatible with the other components of the composite material. In one embodiment, the filler material is a microscale filler.

The one or more additives, in one embodiment, includes a resin. The resin, in some embodiments, is added to the suspension before the suspension liquid is removed. The host material may then be contacted with the resin containing high conductive particles. Therefore, in some embodiments, the composite materials provided herein are made by a method that includes forming a suspension of at least one of microscale high conductive particles and nanoscale high conductive particles, adding a resin to the suspension, removing the suspension liquid from the suspension, and contacting a host material with the resin.

In embodiments, the composite materials provided herein comprise laminated carbon fabric reinforced composite materials. In certain embodiments, the composites comprise carbon nanotubes, carbon nanofibers, or a combination thereof. For example, the composites may comprise single-walled nanotubes, multi-walled nanotubes, carbon nanofibers, or a combination thereof. In one embodiment, the composite material comprises a buckypaper.

These methods are scalable and may be used to tailor the size of a particular composite material to meet the needs of a particular application. The applications in which embodiments of the composite materials may be used include, but are not limited to, aerospace, military, and industrial applications. Useful forms of the composite material include sheets, which may be in a planar or non-planar configuration.

EXAMPLES

The present invention is further illustrated by the following examples, which are not to be construed in any way as imposing limitations upon the scope thereof. On the contrary, it is to be clearly understood that resort may be had to various other aspects, embodiments, modifications, and equivalents thereof which, after reading the description herein, may suggest themselves to one of ordinary skill in the art without departing from the spirit of the present invention or the scope of the appended claims. Thus, other aspects of this invention will be apparent to those skilled in the art from consideration of the specification and practice of the invention disclosed herein.

Example 1—Preparation of Composite Materials

Two kinds of reinforcement fabric were used as host materials to make the composite materials in the following examples: IM7 GP-6k plain weave fabric with an areal density of 190 g/m² produced by Textile Products, Inc, and pitch-based carbon fabric EWC-300X with an areal density of 610 g/m² supplied by Cytec. Epon862 with curing agent epicure-W was used as the resin in these examples.

The microscale high conductive particles and nanoscale high conductive particles were silver particles. The microscale high conductive particles were flake shaped and had an average diameter of less than 20 µm. The nanoscale high conductive particles had an average diameter of smaller than 50 nm. Sintering of the nanoscale silver particles was used to increase thermal conductivity at a temperature higher than 150° C.

The composite samples were fabricated by introducing the nanoscale and microscale silver high conductive particles by several methods to realize inter-tow and intra-tow penetration in the carbon fabrics that served as the host materials. A suspension comprising the nanoscale silver particles and a liquid was prepared, and then applied directly to the dry carbon fabrics. The suspension was allowed to penetrate the fiber tows by capillary force. After the carbon fabric host material was impregnated with the required amount of the suspension, the liquid was volatilized at 150° C. under a vacuum for 1 hour. The nanoscale silver particles deposited on the surface and fully coated each filament of the carbon fabrics; and the nanoscale silver particles were sintered at the volatilization temperature, which provided better connectivity and conductivity.

The microscale silver particles, which were flake shaped, were evenly dispersed in the Epon862 resin system, and then applied to impregnate the carbon fabrics. The resin penetrated through the fiber tows, and the microscale silver flakes were blocked from entering the spaces between the fiber tows due to the larger size of the microscale silver particles. In other words, the size of the microscale silver particles was generally larger than the pores between carbon fiber filaments. The flake shaped microscale silver particles mainly distributed at the inter-tow space. In another example, nanoscale silver particles and microscale silver flakes were associated with the host material by adding the nanoscale silver particles and microscale silver flakes to the Epon 862 resin system. It was believed that sintering of the nanoscale silver particles was beneficial because it helped establish better conduction between the silver flakes.

Figure 2A:
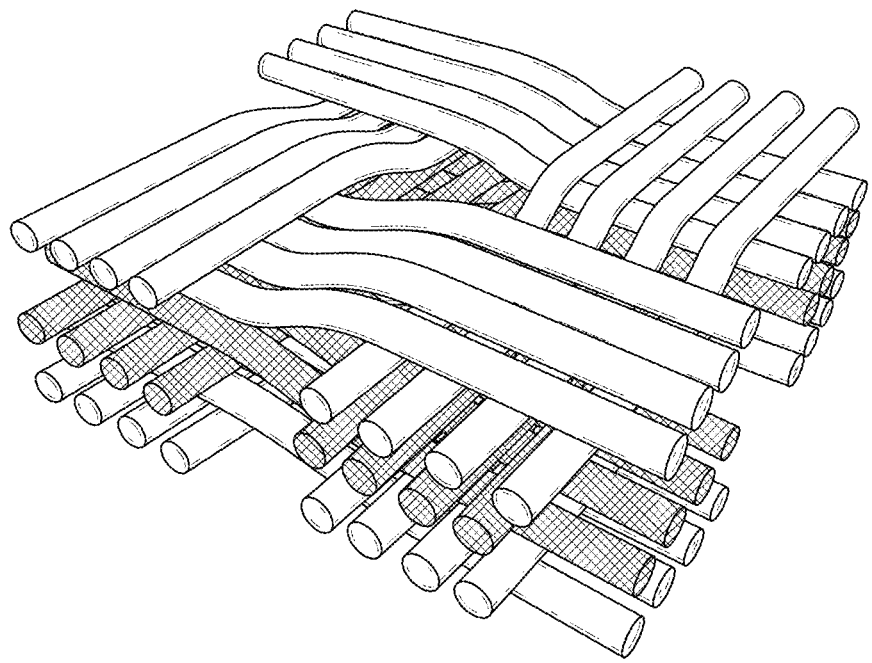
FIG. 2A depicts one embodiment of a host material comprising multiple layers of carbon fabric without silver particles.
Figure 2B:
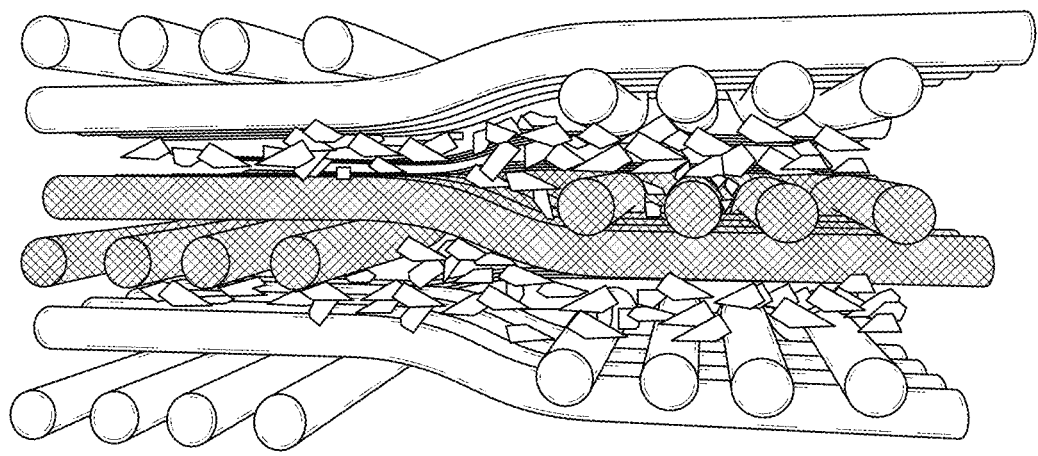
FIG. 2B depicts one embodiment of a composite material comprising multiple layers of carbon fabric and microscale silver flake shaped particles.
Figure 2C:
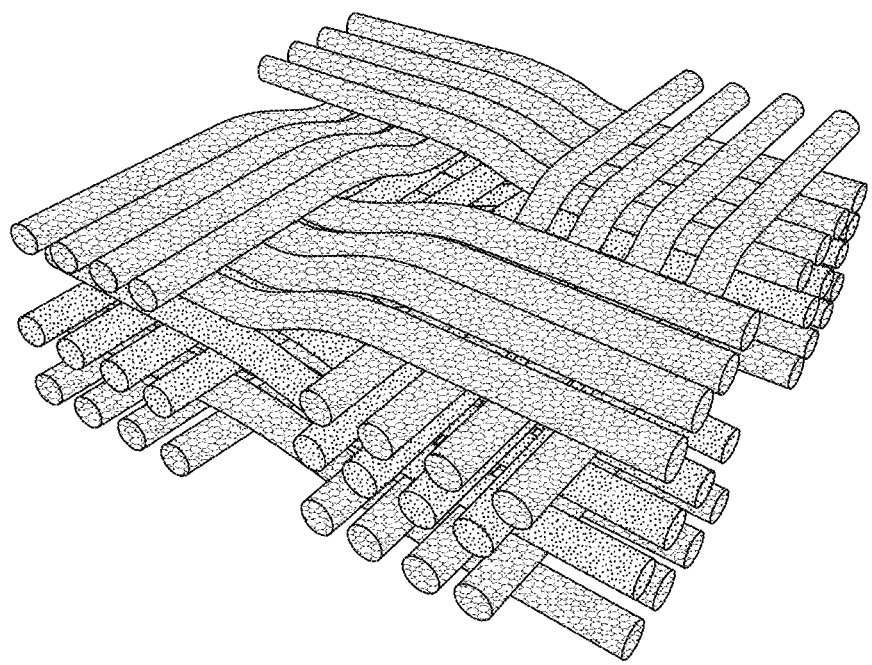
FIG. 2C depicts one embodiment of a composite material comprising multiple layers of carbon fabric coated with silver nanoparticles.
Figure 2D:
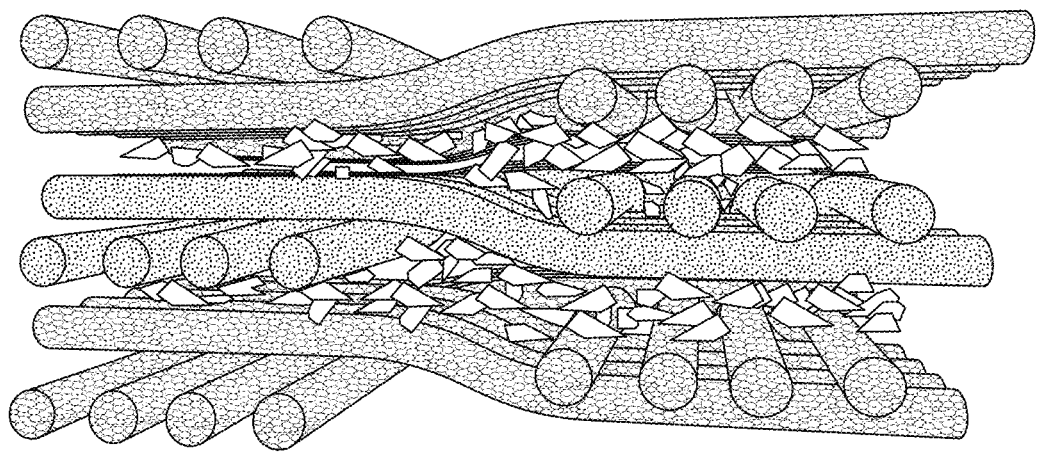
FIG. 2D depicts one embodiment of a composite material comprising multiple layers of carbon fabric, silver nanoparticles, and microscale silver flaked shaped particles.

Using the above-described techniques, three configurations of composite materials were fabricated: a composite material including flake shaped microscale silver particles (ms-CFRP), a composite material including silver nanoparticles (ns-CFRP), and a composite material including both nanoscale silver particles and flake shaped microscale silver particles (mns-CFRP). FIGS. 2B, 2C, and 2D depict schematics of the microstructures of ms-CFRP, ns-CFRP, and mns-CFRP, respectively. For comparison purposes, FIG. 2A depicts a schematic of a multi-layered carbon fabric host material without silver particles.

All of the samples of composite materials were fabricated using a hot-press process. The samples were cured at 190° C. for 3 hours.

Example 2—Property Characterization

A Netzsch laser flash diffusivity tester (Netzsch LFA 457) was used to measure the thermal diffusivity (α) of the composite materials. The measurements followed ASTM E1461 guidelines. The samples, measuring 10×10 mm², were coated with graphite. A graphite sample with known specific heat and thermal diffusivity was used as a reference. TTTC k was then calculated by the following equation:

$$k = \alpha \cdot C_p \cdot \rho \tag{1}$$

wherein $C_p$ is the specific heat and $\rho$ is the specimen density.

Tensile property tests were conducted following ASTM D 3039, by using a MTS landmark machine with a non-contact video extensometer DVE-201 for strain recording. The specimens were measured at crosshead speed of 1 mm/min. E-glass fiber reinforced epoxy tabs were used.

Example 3—TTTC of Woven Carbon Fabric Laminated Composites

EWC300X graphite fibers generally provide a high thermal conductivity of 250-350 W/(m·K) along the fiber axial direction. The corresponding EWC-300X/Epon862 control sample was measured to have a thermal diffusivity of 0.97±0.09 mm²/s and a conductivity of 1.96±0.20 W/(m·K) at 25° C. along the sample's through-thickness direction. SEM images of the cross-section microstructures of the EWC-300X/Epon862 composite sample (control) with a fiber volume concentration of 58.1 v % demonstrated that the resin penetrated warp and weft fiber tows in the laminated structure.

In the control sample, no noticeable contact among fiber tows was observed, leading to the absence of a continuous thermal conduction path in the through-thickness direction. Instead, some resin rich areas were observed between fiber tows and laminar layers. The resin matrix possessed a low thermal conductivity (<0.2 W/(m·K)). These resin rich areas were believed to act as an insulation layer and caused a low TTTC of laminated composites. These areas were mainly distributed at the gap between adjacent parallel tows, interlaminar zones, and intersection of warp and weft fiber tows.

The gap between parallel fiber tows appeared to be rectangular in shape. The morphologies of EWC-300X/Epon862 composite samples (control) with resin rich areas at (a) inter-tow, (b) intersection of warp and weft fiber tows, and (c) interlaminar areas were analyzed via SEM images. As an example, a typical resin gap was approximately 204 μm×85 μm, as determined by images taken of a particular sample. Triangular shaped resin rich areas were formed at the warp and weft fiber tows intersection of the fabric weave structure. A triangular area with the height of 390 μm and base of 80 μm was observed in the SEM images taken of a particular sample. Some narrow resin rich areas were present at the interlaminar areas of the sample, which were approximate 12 μm wide, according to the image of the sample.

The similar resin rich areas were also observed in an IM7/Epon862 composite, causing a lower diffusivity and conductivity of 0.34±0.03 mm$^2$/and 0.72±0.06 W/(m·K), respectively. The difference between IM7 and EWC300X composites was caused by the different thermal conductivities of these two carbon fibers. IM7 fiber had a much lower axial thermal conductivity of 5.40 W/(m·K) than ECW300X fiber in the predicted range of 250-350 W/(m·K).

Example 4—Thermal Diffusivity and Conductivity

The nanoscale silver particles and microscale silver flakes of Example 1 were used to improve the TTTC of the carbon fabric reinforced composites. Silver was chosen due to its high thermal conductivity and possible ability to establish better continuous conduction paths through inter-particle sintering at moderate temperatures.

Figure 3A:
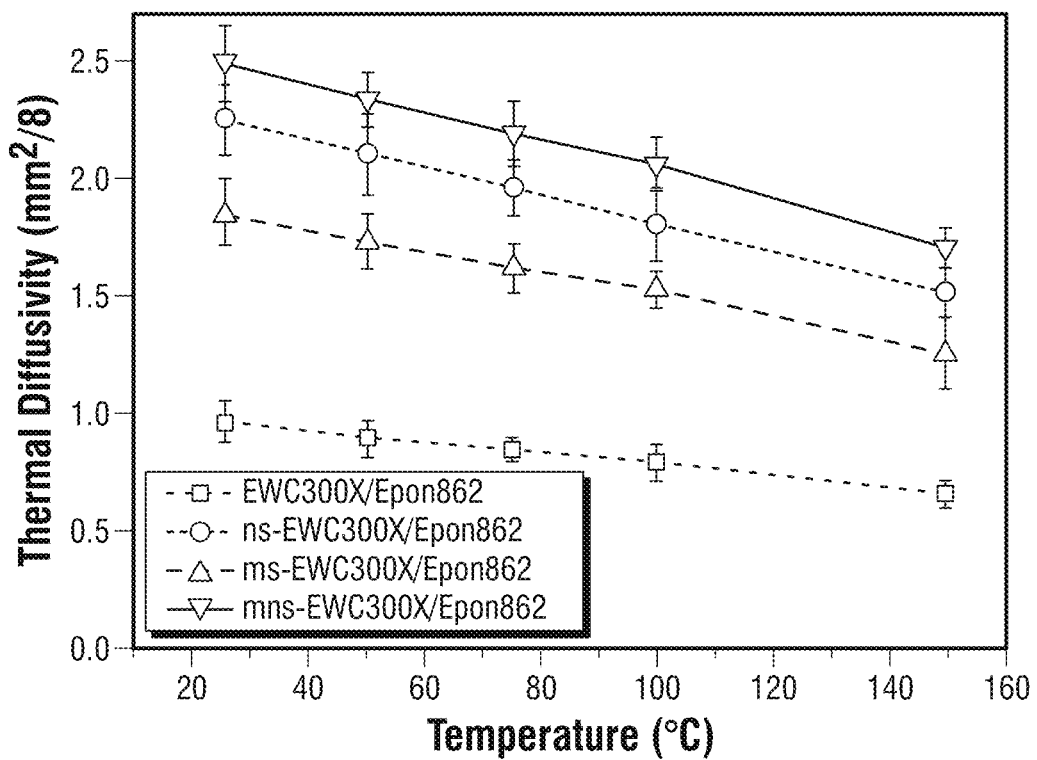
FIG. 3A is a chart comparing the thermal diffusivity of various samples of materials.
Figure 3B:
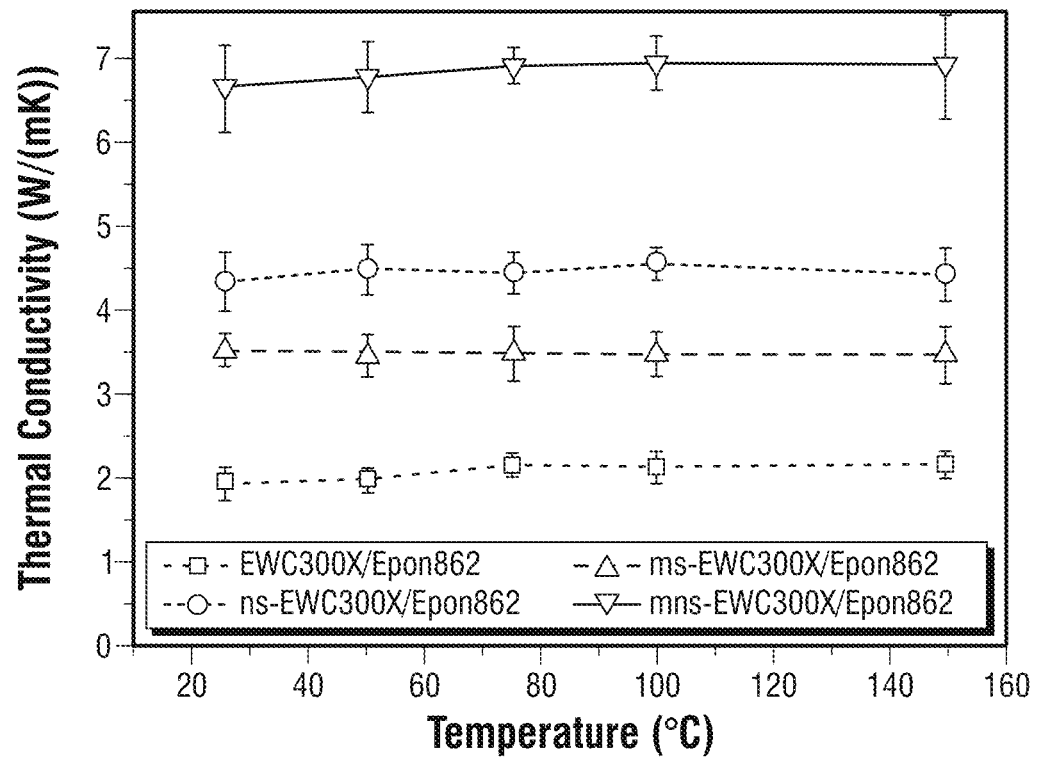
FIG. 3B is a chart comparing the conductivity of various samples of materials.

Three types of EWC-300X/Epon862 composite samples were prepared utilizing the nanoscale and microscale silver particles. These included ms-CFRP, ns-CFRP, and mns-CFRP samples. FIGS. 3A and 3B show the thermal conductivities and diffusivities of different composite samples. Specifically, FIG. 3A is a comparison of thermal diffusivity, and FIG. 3B is a comparison of conductivity of the EWC300X/Epon862 ns-CFRP, ms-CRRP, mns-CFRP, and CFRP control samples with densities of 2.21 g/cm$^3$, 1.99 g/cm$^3$, 2.18 g/cm$^3$ and 1.70 g/cm$^3$, respectively. The thermal diffusivity decreased as the temperature increased, while the specific heat capacity showed an increasing trend. The control composite sample was measured to have a thermal diffusivity and conductivity of 0.97±0.09 mm$^2$/s and 1.96±0.20 W/(m·K) at 25° C., respectively. The thermal diffusivity and conductivity noticeably increased, however, after applying a volume fraction of about 5 volume % of silver particles, as shown at FIGS. 3A and 3B.

The corresponding ns-CFRP and ms-CFRP samples with silver concentrations of 5.2 volume % and 4.7 volume %, had densities of 2.21 g/cm$^3$ and 1.99 g/cm$^3$, respectively. The ns-CFRP demonstrated thermal diffusivity and conductivity of 2.26±0.15 mm$^2$/s and 4.33±0.35 W/(m·K), while the ms-CFRP provided the similar thermal performance of 1.86±0.14 mm$^2$/s and 3.51±0.19 W/(m·K). The application of both nanoscale and microscale silver particles to mns-CFRP, however, significantly improved the characteristics of the composite material. With a silver concentration of 5.1 volume % and a density of 2.18 g/cm$^3$, mns-CFRP exhibited the highest thermal diffusivity and conductivity: 2.50±0.16 mm$^2$/s and 6.62±0.51 W/(m·K), respectively.

Figure 4A:
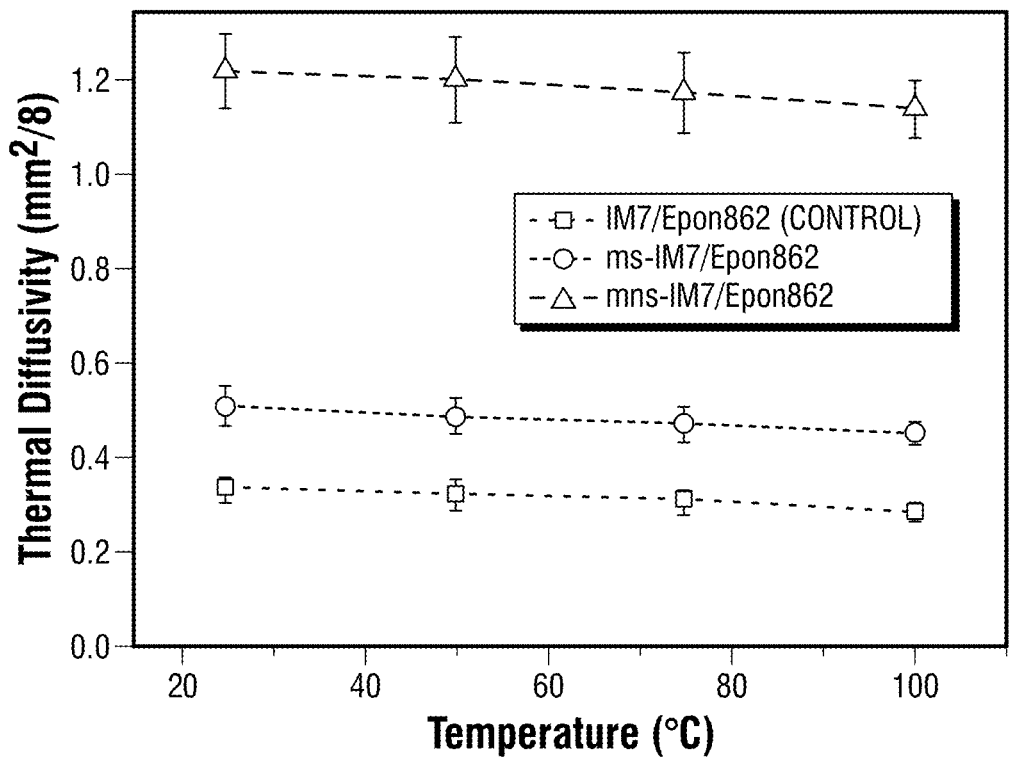
FIG. 4A is a chart comparing the thermal diffusivity of various samples of materials.
Figure 4B:
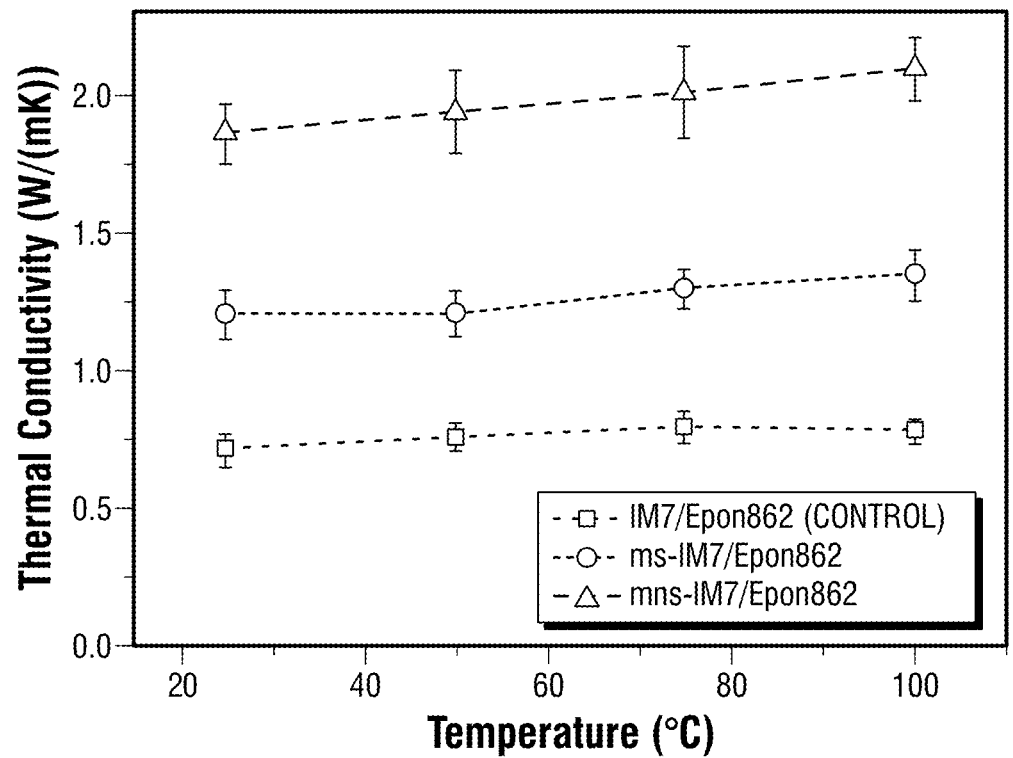
FIG. 4B is a chart comparing the conductivity of various samples of materials.
Figures 1, 5A:
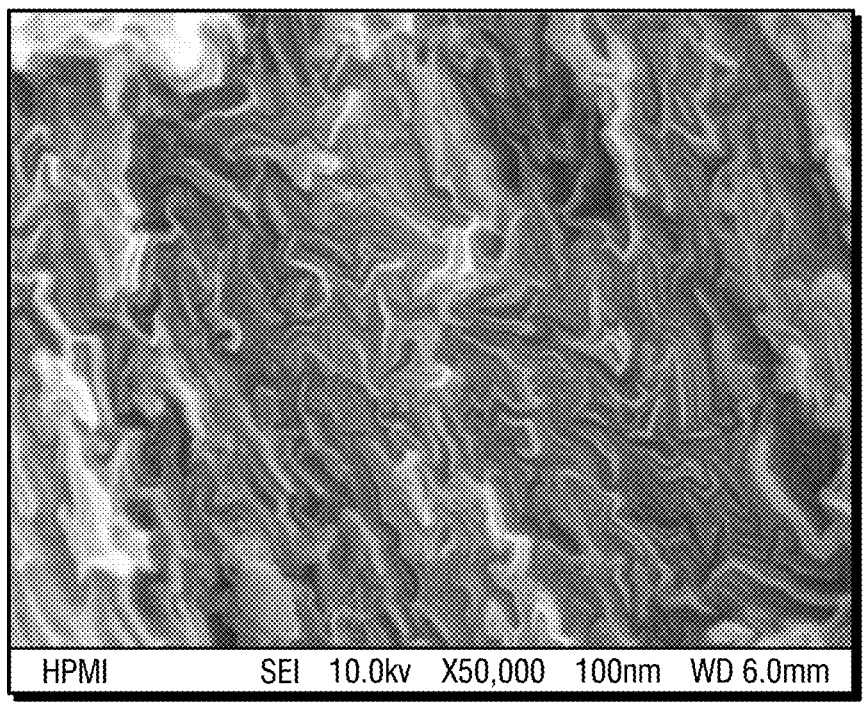
Figures 2, 5A:
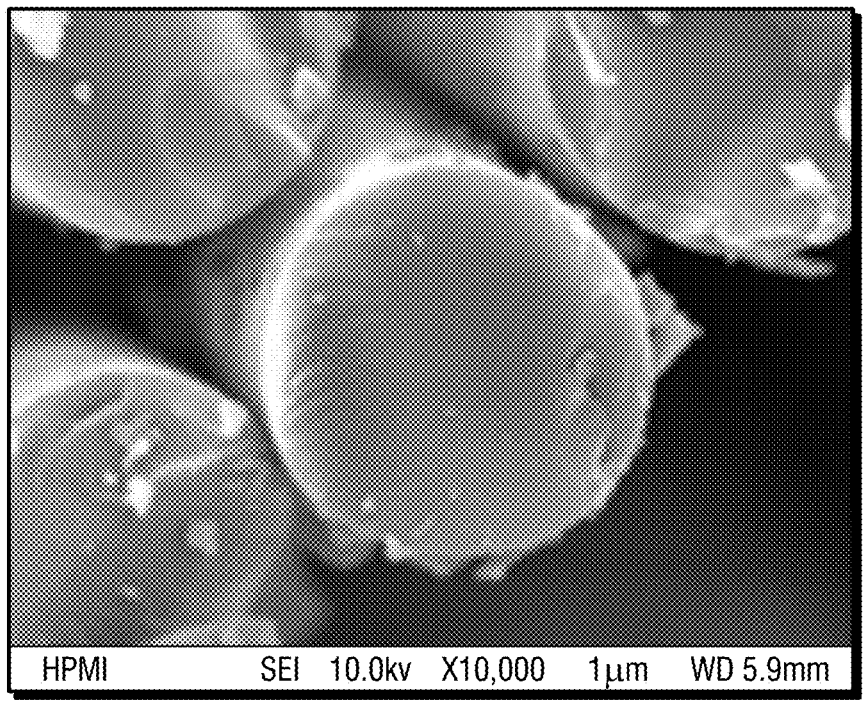
Figures 1, 5B:
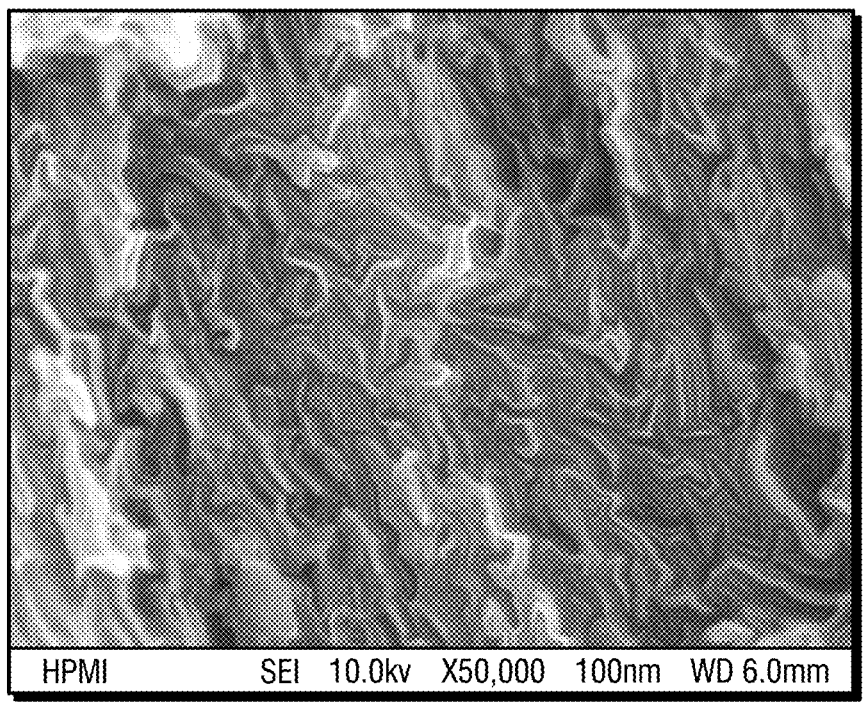
Figures 2, 5B:
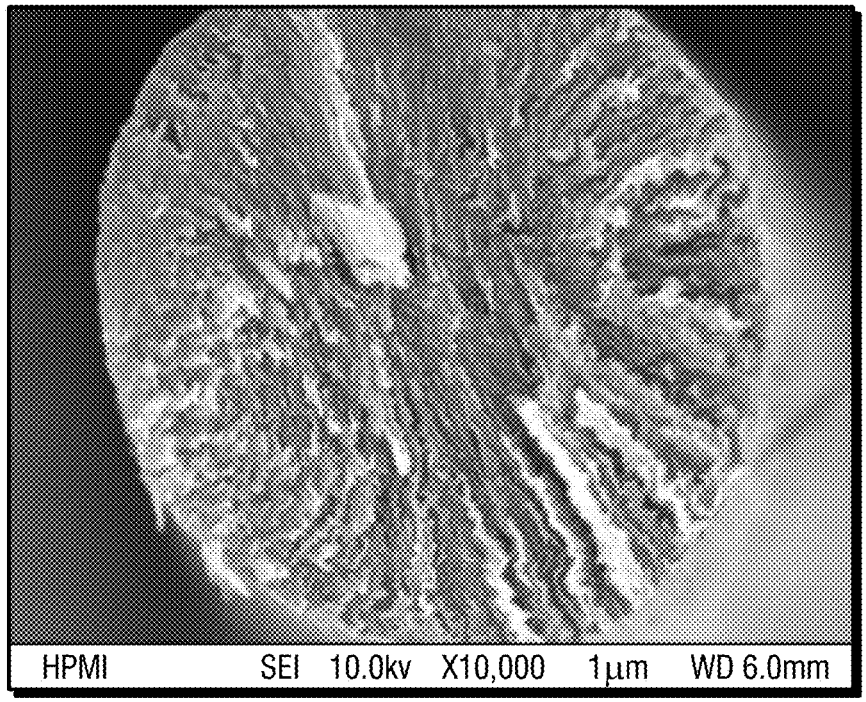

The IM7/Epon862 composites showed similar thermal behavior, as shown at FIGS. 4A and 4B. Specifically, FIG. 4A is a chart comparing the thermal diffusivity, and FIG. 4B is a chart comparing the conductivity of the IM7/Epon862 ms-CRRP, mns-CFRP, and CFRP control samples with densities of 1.46 g/cm$^3$, 2.01 g/cm$^3$, and 2.11 g/cm$^3$, respectively. The control sample with a fiber volume fraction of 55.3 volume %, exhibited a thermal diffusivity of 0.34±0.03 mm$^2$/s and conductivity of 0.72±0.06 W/(m·K) at 25° C. The mns-IM7/Epon862 composite with a 5.5 v % silver showed improved thermal diffusivity and conductivity of 1.23±0.08 mm$^2$/s and 1.86±0.11 W/(m·K) at 25° C., respectively.

Both control and mns-CFRP samples of IM7/Epon 862 were much lower than those of the EWC300X/Epon862 composites with similar laminated or heterogeneous silver structures. This was believed to be due to the large difference in thermal conductivity between PAN-based and pitch-based carbon fibers. The thermal conductivity properties were likely related to the microstructure of carbon fiber. FIGS. 5A-1 and 5A-2 and FIGS. 5B-1 and 5B-2 depict the cross-sectional morphologies of IM7 and EWC300X carbon fiber, respectively. The IM7 PAN-based carbon fiber displayed a particulate cross-sectional morphology. In contrast, EWC300X pitch fiber showed dense packing of long graphite sheets in its morphology, with basal planes radiating from the fiber's center, forming radial transverse textures. This most likely contributed to a higher thermal conductivity in the radial direction of the pitch fiber.

Example 5—Heterogeneous Microstructures

Figure 6A:
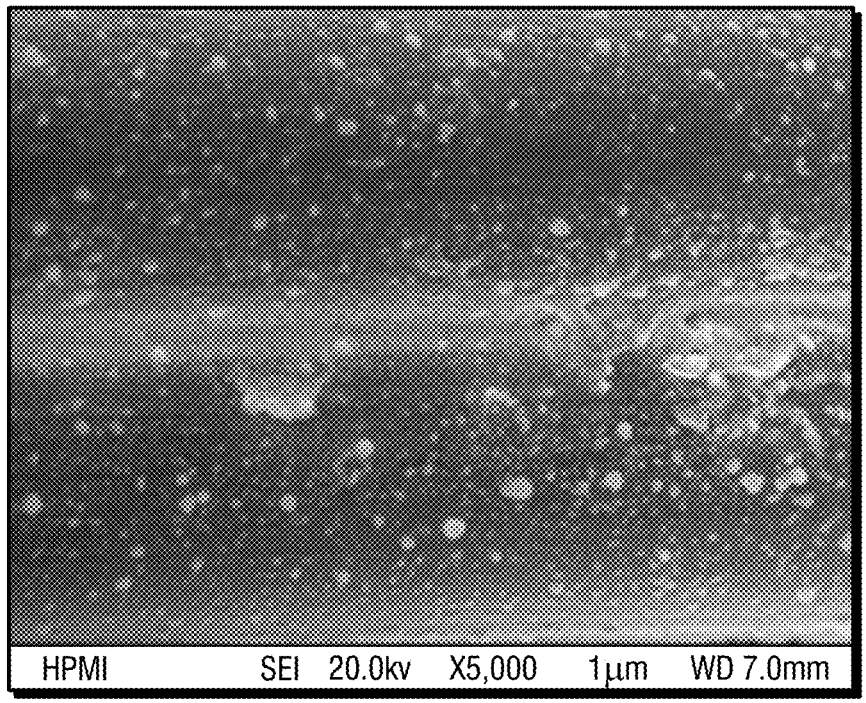
FIG. 6A depicts the morphology of fiber connection by silver nanoparticles coated on the fibers' surfaces.
Figure 6B:
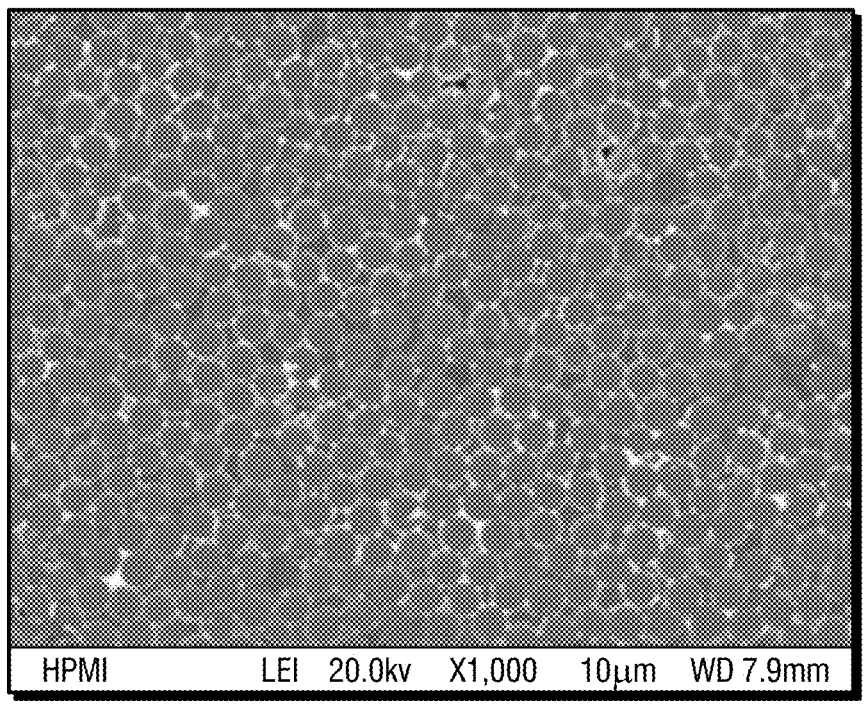
FIG. 6B depicts the morphology of the distribution of silver nanoparticles crossing the fiber tow cross-section.
Figure 8A:
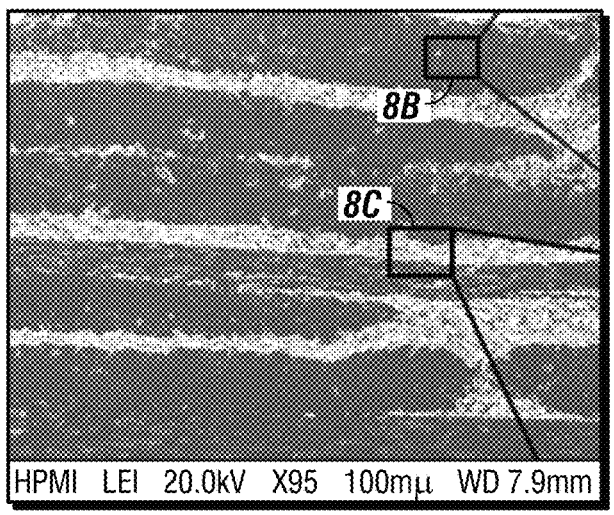
FIG. 8A depicts the heterogeneous distribution of nanoscale silver particles and microscale silver particles in one embodiment of a composite material.
Figure 8B:
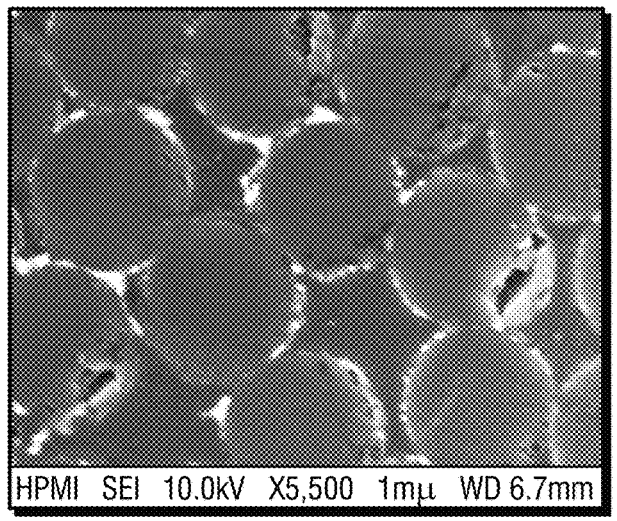
FIG. 8B depicts a portion of the composite material at higher magnification.
Figure 8C:
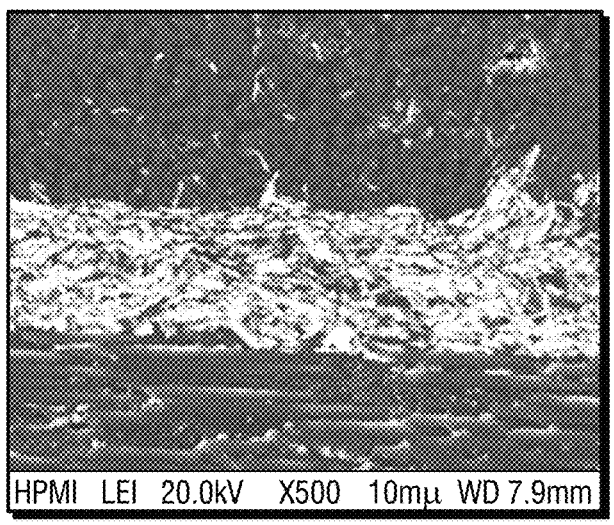
FIG. 8C depicts a portion of the composite material at higher magnification.

FIGS. 6A and 6B depict the morphologies of the composite samples. As shown at FIG. 6A, nanoscale silver particles were able to penetrate the fiber tows and deposit on the surface of carbon fibers, thereby enhancing the thermal conductivity within the fiber tows. FIG. 6B depicts the distribution of nanoscale silver particles on the carbon fiber. The bright circles surrounding carbon fibers were silver depositions on the carbon fibers' surfaces. The nanoscale silver particles, in this particular composite material, were not evenly distributed in the matrix among the carbon fiber filaments, but coated on the carbon fiber surface to connect adjacent filaments, thereby forming a continuous conductive path. The silver nanoparticles were sintered to establish a better connection, and the sintering caused some particles to form larger agglomerates. The flake shaped microscale silver particles were mainly distributed in the resin rich areas between fiber tows with only a small amount penetrating the tows, as shown at FIGS. 8A, 8B, and 8C.

Figure 7A:
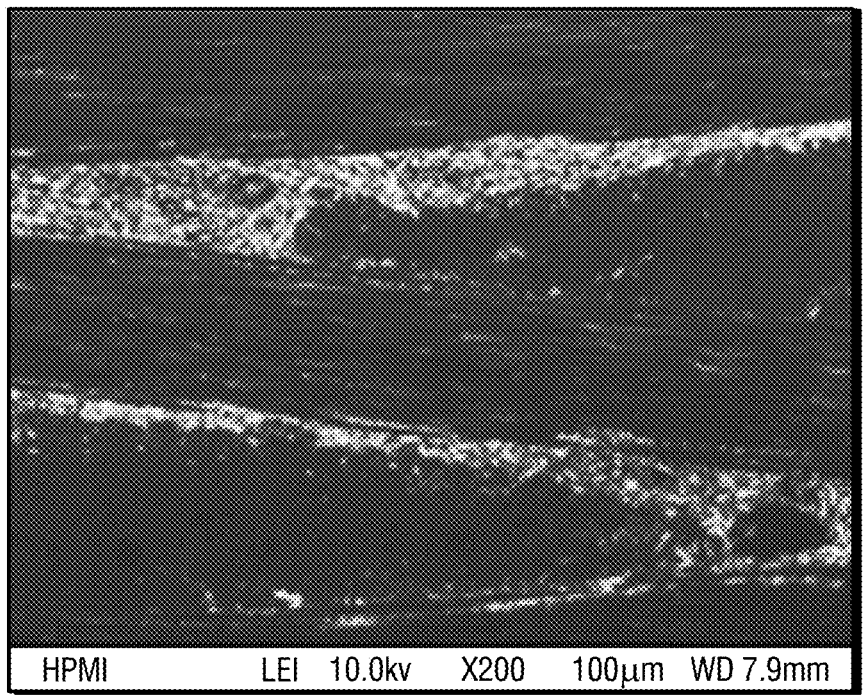
FIG. 7A depicts the morphology of a continuous interply conduction path of silver in one embodiment of a composite material.
Figure 7B:
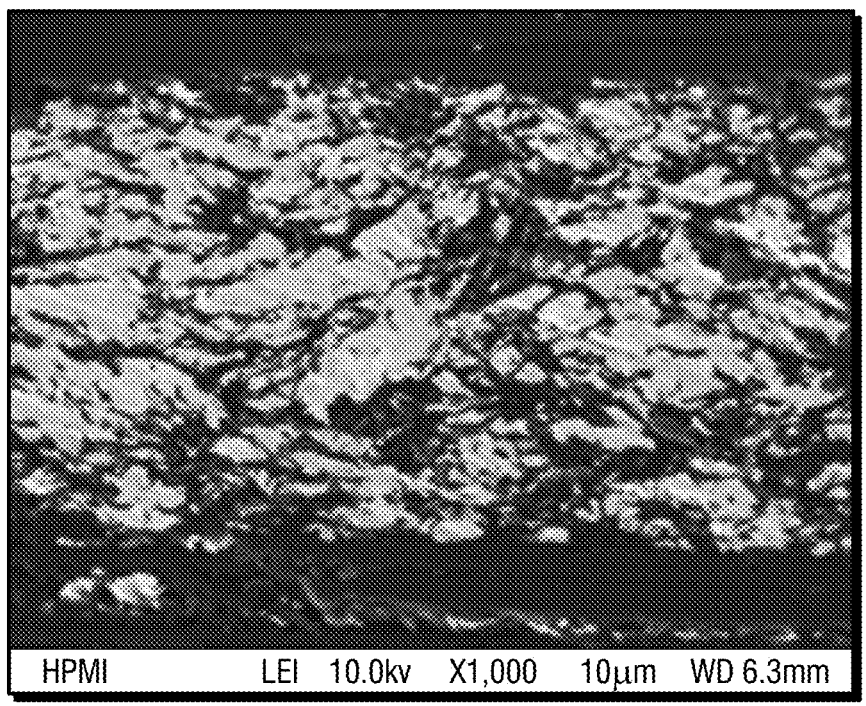
FIG. 7B depicts the morphology of partly sintered silver flakes in one embodiment of a composite material.

FIG. 7A depicts the morphology of a continuous interply conduction path of silver in one embodiment of a composite material, and FIG. 7B depicts the morphology of partly sintered silver flakes in one embodiment of a composite material. The size of inter-tow silver particles was much larger than that of the pristine silver flakes, indicating silver agglomeration and sintering during the sample manufacturing process. The resultant larger silver particles may be beneficial to construct conductive paths across the large resin rich areas. The distribution of silver particles likely was influenced by the intra- and inter-tow porosity, at least in these particular composite materials.

When used alone, the nanoscale silver particles or microscale silver particles were observed to improve only the intra- or inter-tow conduction, respectively, but were not able to establish sufficient continuous paths in the through-thickness direction. However, when used in combination, the microscale silver particles and nanoscale silver particles effectively connected the conduction paths among intra- and inter-tow, which resulted in greater thermal conductivity of mns-CFRP having a similar density, as shown at FIG. 8A-C.

Example 6—Effect of Silver Concentration on TTTC

Figure 9A:
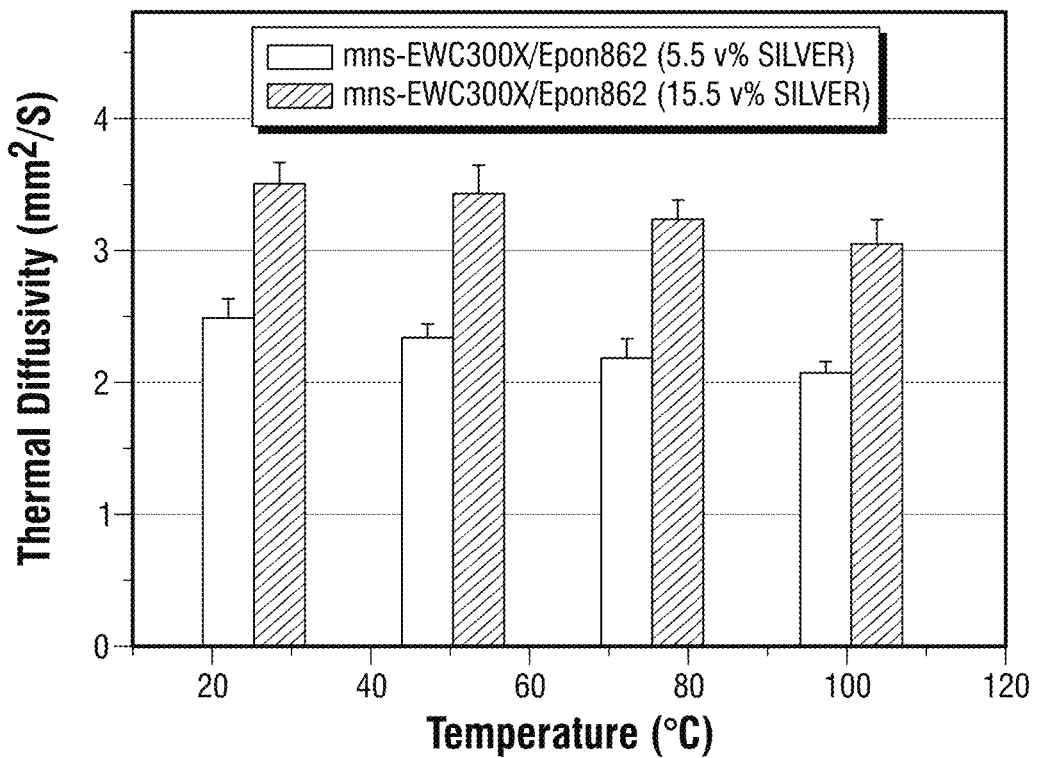
FIG. 9A depicts the thermal diffusivity of several materials.
Figure 9B:
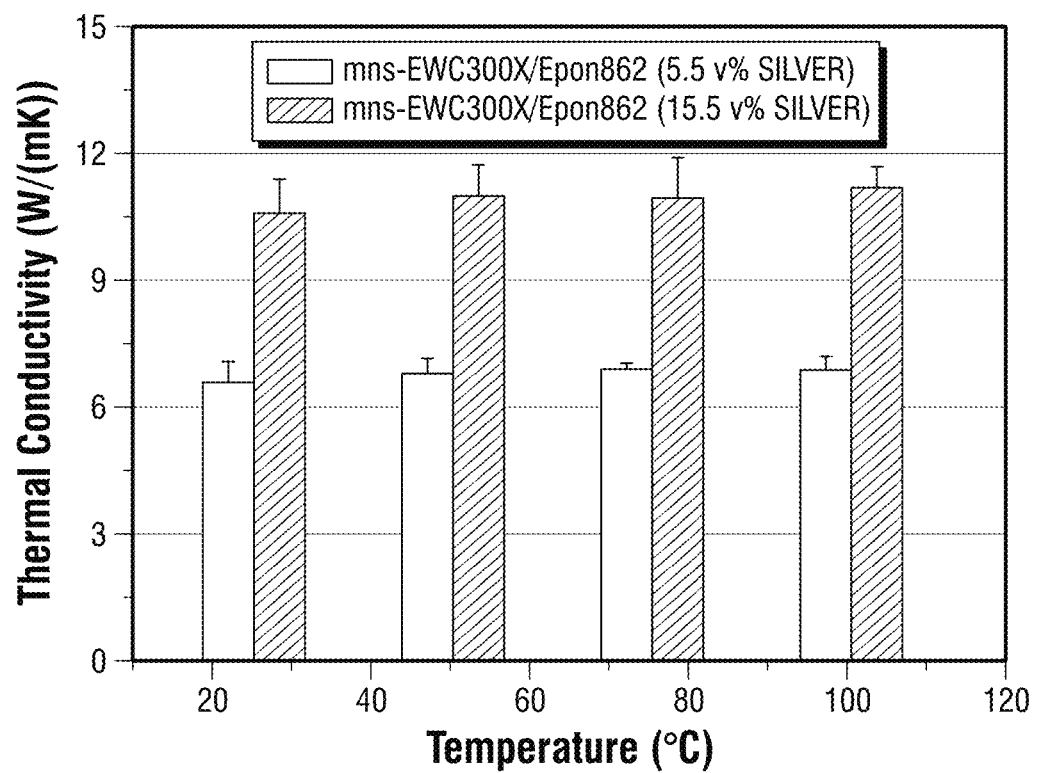
FIG. 9B depicts the conductivity of several materials.

FIGS. 9A and 9B depict the thermal diffusivity and conductivity of the EWC-300X/Epon862 composites having different silver concentrations. In general, the thermal diffusivity and conductivity were enhanced by increasing the silver concentration. The diffusivities of the EWC-300X/Epon862 were approximately 2.5 and 3.6 mm²/s with silver volume fractions of 5.5 volume % and 15.5 volume %, respectively. The corresponding TTTCs were 6.62±0.51 and 10.63±0.81 W/(m·K). It was believed that the nanoscale silver increased the interface thickness between the carbon fibers and the resin matrix, thereby weakening the load transfer capacity. It was observed that the microscale silver flakes largely occupied inter-ply areas, likely causing less resistance to delamination crack propagations.

Example 7—TTTC Modeling

The TTTC of the composite materials was determined, in some instances, by using the Landau and Lifshitz models, which are based on the material thermal conductivities and their interactions (see Warrier, P., and Teja, A. Effect of particle size on the thermal conductivity of nanofluids containing metallic nanoparticles. Nanoscale Research Letters 6 (2011): 247; and Goual, M. S., Bali, A., and Queneudec, M. Effective thermal conductivity of clayey aerated concrete in the dry state: experimental results and modeling. Journal of Physics D 32(23) (1999): 3041-3046).

$$k_c^n = k_f^n \cdot \phi_f + k_m^n (1-\phi_f) \quad -1 \leq n \leq 1 \quad (2)$$

wherein $k_c$, $k_m$, and $k_f$ are the thermal conductivities of the composite, matrix and filler. $\phi_f$ is volume fraction of filler. According to Equation (2), when n=1, thermal conductivity $k_c$ of a two-phase mixture can be written in parallel conduction model, which predicts the maximum thermal conductivity (see Han, S., Lin, J. T., Yamada, Y., and Chung D. D. L. Enhancing the thermal conductivity and compressive modulus of carbon fiber polymer-matrix composites in the through-thickness direction by nanostructuring the interlaminar interface with carbon black. Carbon 46(7) (2008): 1060-1071):

$$k_c = k_f \phi_f + k_m (1-\phi_f) \quad (3)$$

When n approaches zero, geometric mean model was given as follows:

$$k_c = k_f^{\phi_f} \cdot k_m^{(1-\phi_f)} \quad (4)$$

For n=−1, a series conduction model can be yielded:

$$\frac{1}{k_c} = \frac{(1-\phi_f)}{k_m} + \frac{\phi_f}{k_f} \quad (5)$$

which provides the minimum thermal conductivity estimation. The laminated composite structure can be treated as a simple series conduction model with the unit of fabric ply. Individual ply parallel conduction was established with the two units of fiber tows and inter-tow resin rich area. Along the through-thickness direction, there likely was no continuous conductive path, at least in some samples, due to resin rich areas among the fiber tows and interlaminar resin gaps native to the construction of the composites. It is believed that these resin rich areas supplied space for highly conductive particles to construct effective through-thickness conductive paths. Larger sized particles had the potential to bridge the large resin rich areas among fiber tows, and interlaminar areas, and smaller sized particles had the potential to penetrate the fiber tow.

The thermal conductivity of the composites comprising silver particles was calculated by Equations 3 and 4. Investigating the mns-EWC300/Epon862 composite with a density of 2.18 g/cm³, for example, the volume fraction of silver was calculated as 5.1 volume % based on TGA analysis and the respective densities of silver, carbon fibers, and resin. The thermal conductivity of the carbon fiber and resin composition was equivalent to the control sample: 1.96 W/(m·K). Silver possesses a thermal conductivity of 429 W/(m·K). The thermal conductivity based on the geometric mean model, assuming homogenously distributed discontinuous conductive particles, was calculated as 2.56 W/(m·K) for mns-CFRP with a density of 2.18 g/cm³, which was much lower than the experimental result of 6.62 W/(m·K). However, the experimental results were much lower than the predicted 23.2 W/(m·K) calculated from the parallel conduction model, which was based on the assumption of a full continuous silver conductance path. This result indicated some through-thickness continuous conduction paths were established by the silver materials in the composites, which was in agreement with the establishment of heterogeneously conductive paths in the composites, as shown at FIGS. 8A, 8B, and 8C.

Figure 10:
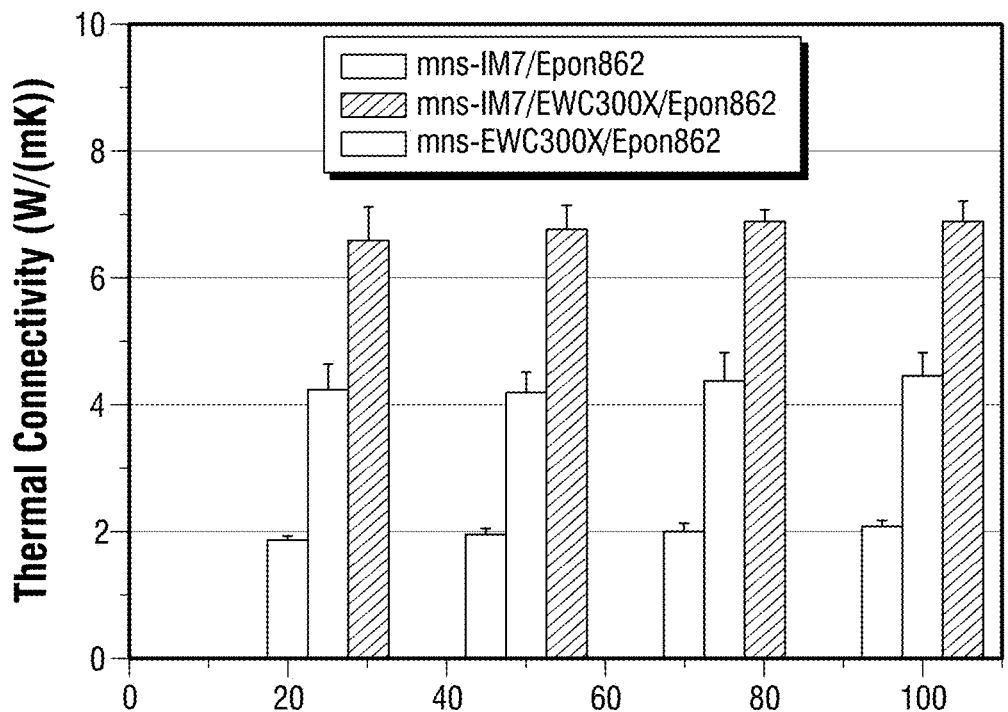
FIG. 10 depicts the conductivity of several materials.

Example 8—Hybridization to Tailor Thermal Conductivity and Mechanical Properties In order to obtain a synergistic combination of the high mechanical performance of IM7 composites and high conductivity property of EWC300X composites, a hybrid IM7/EWC300X composite was produced. FIG. 10 depicts a comparison of the thermal conductivity of IM7/Epon862 and EWC300/Epon862 composites, as well as the hybrid composite, IM7/EWC300/Epon862. The hybrid composite was prepared by using the following ply stacking sequence: [IM7₂/EWC300X]s. These samples were filled with both nanoscale silver particles and microscale silver particles or "mns-type", according to the sample design. The density was 2.17 g/cm³ and silver fraction was 5.7 volume %. The hybrid composite had a thermal conductivity of 4.27±0.39 W/(m·K), which was in between the conductivity of 1.96 W/(m·K) for the IM7/Epon862 composite material and the conductivity of 6.62 W/(m·K) for the EWC300X/Epon862 composite material have a 5.5 volume % silver load. The thermal conductivity results demonstrated that the IM7 composite conductivity can be improved through the above-described hybridization approach. The volume fraction ratio of EWC300X to IM7 in this example was about 3:2. According to Equation (5), the calculated thermal conductivity was 3.39 W/(m·K) lower than the experimental result, which suggested a positive hybrid effect.

Example 9—Tensile Property Characterization

Figure 11:
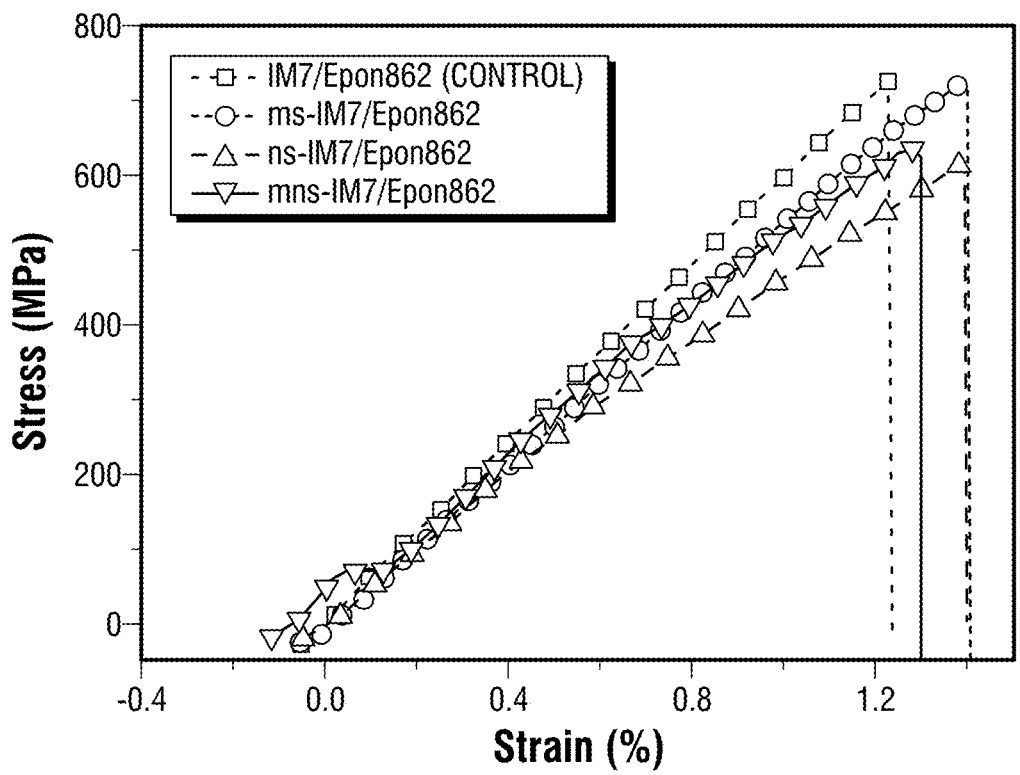
FIG. 11 depicts the stress-strain curves of several materials.

FIG. 11 depicts typical tensile stress-strain curves for the silver filled IM7/Epon862 composite material and control composite materials. The densities of the IM7/Epon862 control composite material, ms-CFRP, ns-CFRP and mns-CFRP were 1.46, 2.01, 1.92, and 2.14 g/cm³, respectively. The tensile stress was almost linearly proportional to the strain until failure for all four samples. Table 1 shows the resultant tensile strength and modulus properties. The control sample had a tensile strength of 730.2 MPa and a modulus of 60.1 GPa. The ms-CFRP exhibited a similar strength of 724.9 MPa and modulus of 55.3 GPa. This likely was due to the silver flakes being mainly distributed in the resin rich areas, which did not affect the load bearing capability of carbon fibers. With the application of nanoscale silver, an audible cracking sound could be heard during the tests in the linear phase of the stress-strain curves. The tensile strength and modulus of ns-CFRP and mns-CFRP decreased to 621.2 MPa and 639.1 MPa, respectively. It was believed that the coating of nanoscale silver particles may have reduced the interface bonding with the resin matrix and decreased load transfer within the sample. Compared with the control sample, tensile strength and modulus of the mns-CFRP samples decreased about 12.5% and 13.6%, respectively.

TABLE 1

Tensile performances and through-thickness thermal conductivities of IM 7/Epon 862, EWC300/Epon 862 and their hybrid composites.

| | Density (g/cm$^3$) | Silver fraction (v %) | Thermal conductivity (W/(mK)) | Tensile strength (MPa) | Tensile modulus (GPa) |
|---|---|---|---|---|---|
| IM7/Epon862 | 1.46 | 0 | 0.72 ± 0.06 | 730.2 ± 25.4 | 60.1 ± 2.1 |
| ms-IM7/Epon862 | 2.01 | 5.3 | 1.21 ± 0.09 | 724.9 ± 20.3 | 55.3 ± 2.9 |
| ns-IM7/Epon862 | 1.99 | 5.2 | 1.17 ± 0.08 | 621.2 ± 18.4 | 44.0 ± 3.1 |
| mns-IM7/Epon862 | 2.11 | 5.5 | 1.86 ± 0.11 | 639.1 ± 10.5 | 51.9 ± 5.1 |
| EWC300X/Epon862 | 1.70 | 0 | 1.96 ± 0.20 | 324.1 ± 19.6 | 91.2 ± 5.2 |
| mns-EWC300X/Epon862 | 2.21 | 5.1 | 6.62 ± 0.51 | 222.5 ± 17.9 | 82.2 ± 4.7 |
| IM7/EWC300X/Epon862 | 1.60 | 0 | 1.28 ± 0.08 | 373.2 ± 19.4 | 74.1 ± 4.3 |
| mns-IM7/EWC300X/Epon862 | 2.17 | 5.7 | 4.27 ± 0.39 | 309.3 ± 12.8 | 61.2 ± 5.4 |

Figure 12:
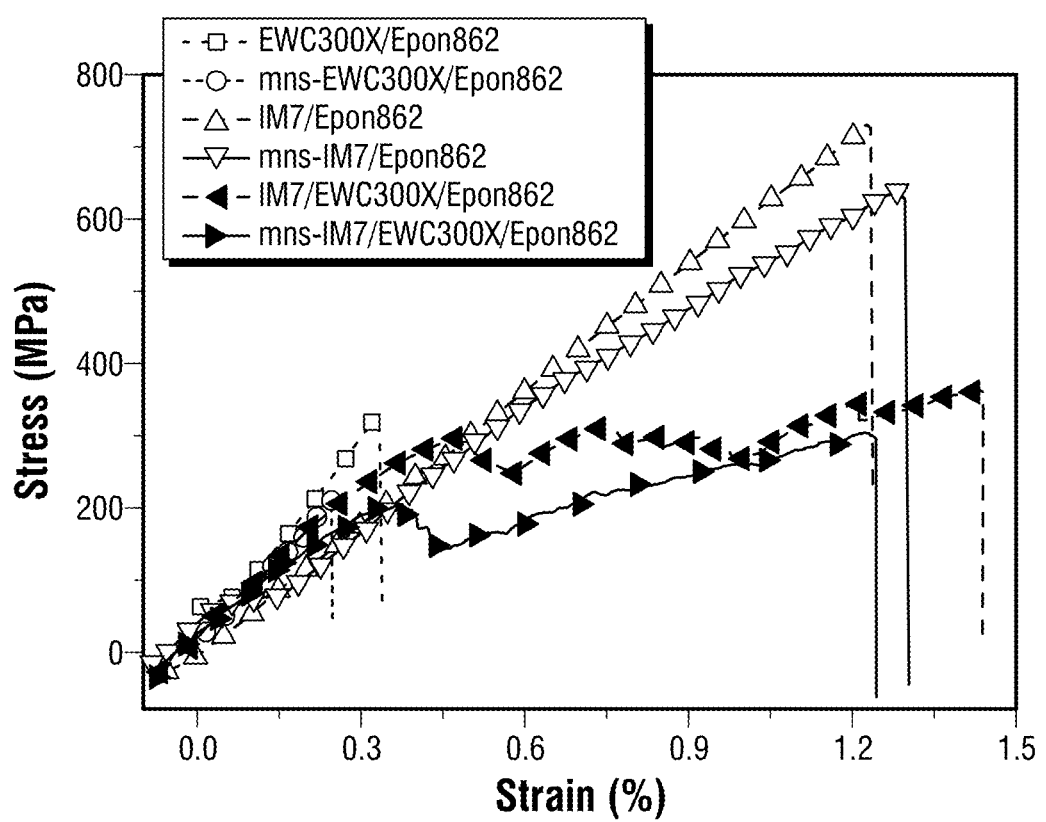
FIG. 12 depicts the tensile stress-strain curves of several materials.

FIG. 12 depicts the tensile stress-strain curves of the IM7/Epon862, EWC300X/Epon862 and IM7/EWC300X/Epon862 composite materials and their heterogeneously silver filled counterparts. The resultant EWC300/Epon862 composite showed a lower strength (324.1 MPa) and higher modulus (91.2 GPa) than the IM7/Epon862 composite material. Both IM7 and EWC300X composites experienced a brittle failure mode in this particular example. After applying silver materials, the tensile performance of the nms-EWC300X/Epon862 and mns-IM7/Epon862 composite noticeably decreased in this particular example. The IM7/EWC300X/Epon862 hybrid composite with a lay-up of [IM7$_2$/EWC300X]s showed a stage-wise stress-strain curve. The modulus of the hybrid composites was between the mns-IM7 and EWC300X composites in the initial stage. The EWC300X layer failed first, likely due to its smaller fiber elongation, while the IM7 fibers with higher strength held the tensile load until the sample's final fracture. The silver filled hybrid composites exhibited a similar tendency, but with lower performance. The resultant tensile and thermal conductivities are summarized in Table 1. Both the tensile and thermal conductivity performance of IM7/EWC300X hybrid composite were in between the IM7 and EWC300X composite materials. The results indicated that hybrid composite materials likely inherited the excellent tensile performance of IM7 composite and superior thermal conductivity of EWC300X composite.

The results of the above-described examples generally demonstrated that the IM7 fiber composite materials exhibited lower thermal diffusivity and conductivity than the EWC300X pitch fiber composite materials. As previously described, the hybrid composite materials, such as the IM7/EWC300X/sliver particle hybrid composites, enjoyed improvement in thermal conductivity.

In some embodiments, the TTTC of laminated graphite fiber fabric reinforced composite materials was enhanced by applying nanoscale silver particles and microscale silver particles, as described herein, to construct heterogeneous thermally conductive paths along the composite's through-thickness direction. In one embodiment, by separately applying a combined 5 volume % of microscale silver flakes and nanoscale silver particles, the TTTC of a EWC300X/Epon862 composite material increased to 3.51 and 4.33 W/(m·K), respectively. The corresponding morphology of this particular material indicated that the flake shaped micro scale silver particles were distributed within the inter-tow area, while nanoscale silver particles penetrated into the fiber tows and formed a coating layer on the fiber surfaces through sintering. Neither filler alone likely can form continuous conductive paths due to their size limitations, however, together a synergistic effect was observed.

A higher conductivity of 6.62 W/(m·K) for EWC300X/Epon862 composites having a similar total silver volume fraction of approximately 5 volume % can be achieved through the formation of continuous through-thickness conduction paths by applying both nanoscale silver particles and microscale silver particles and sintering them at least partly. The TTTC increased with increasing silver volume fraction, and a TTTC of 10.61 W/(m·K) was achieved with the silver volume fraction of 15 volume % and a density of 2.85 g/cm$^3$ in a EWC300X/Epon862 composite material. In contrast, the IM7 fiber composites exhibited lower thermal diffusivity and conductivity than the EWC300X pitch-based fiber composites, likely due to its low fiber conductivity. HybridIM7/EWC300X composites were explored to seek the synergy of IM7 composites' higher mechanical properties and EWC300X composites' attractive thermal conductivity. The hybrid composites demonstrated promising thermal conductivity and tensile performance.

Example 10—Reproducibility of High Thermal Conductivity

Figure 13A:
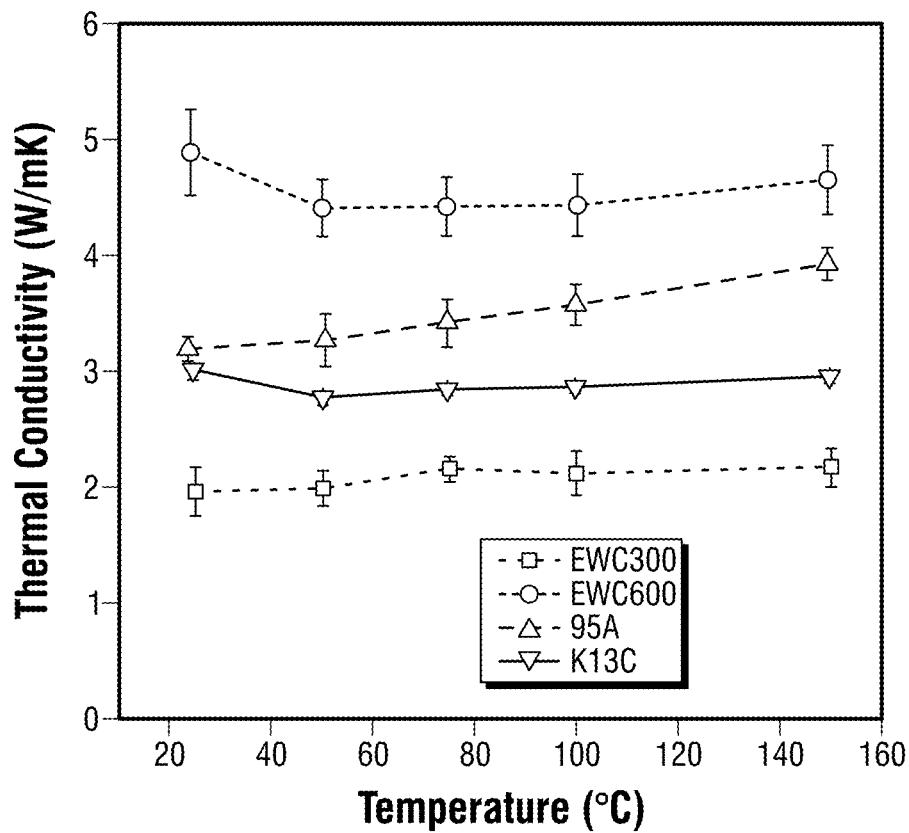
FIG. 13A depicts the thermal conductivities of several possible host materials.
Figure 13B:
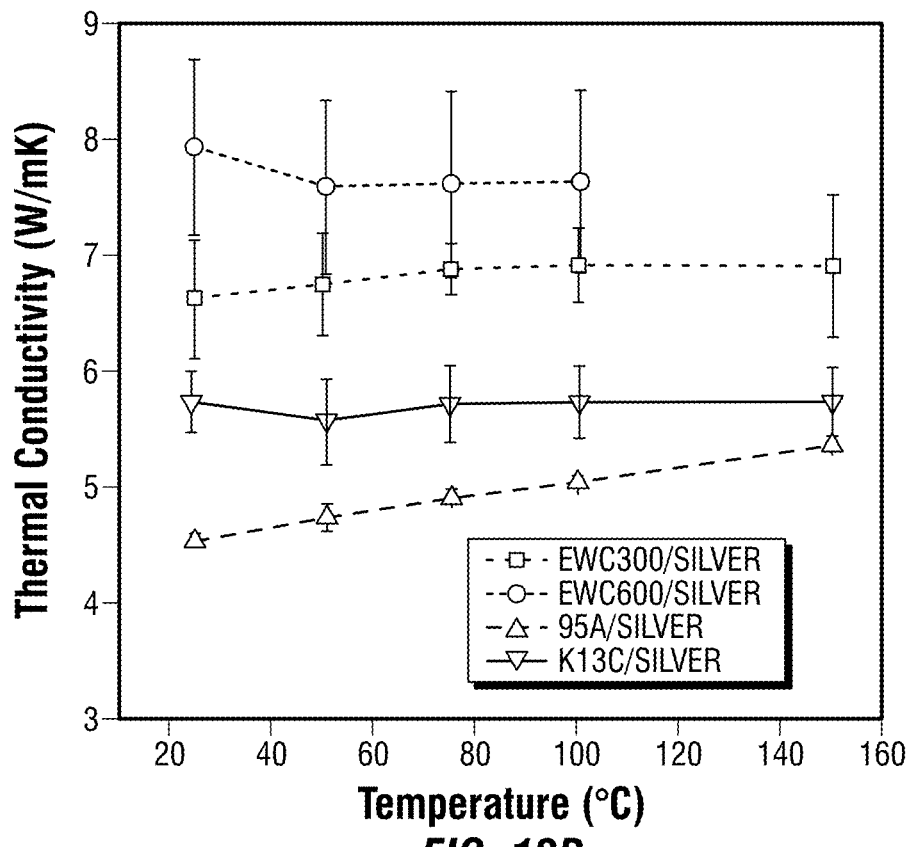
FIG. 13B depicts the thermal conductivities of several embodiments of composite materials.
Figure 14A:
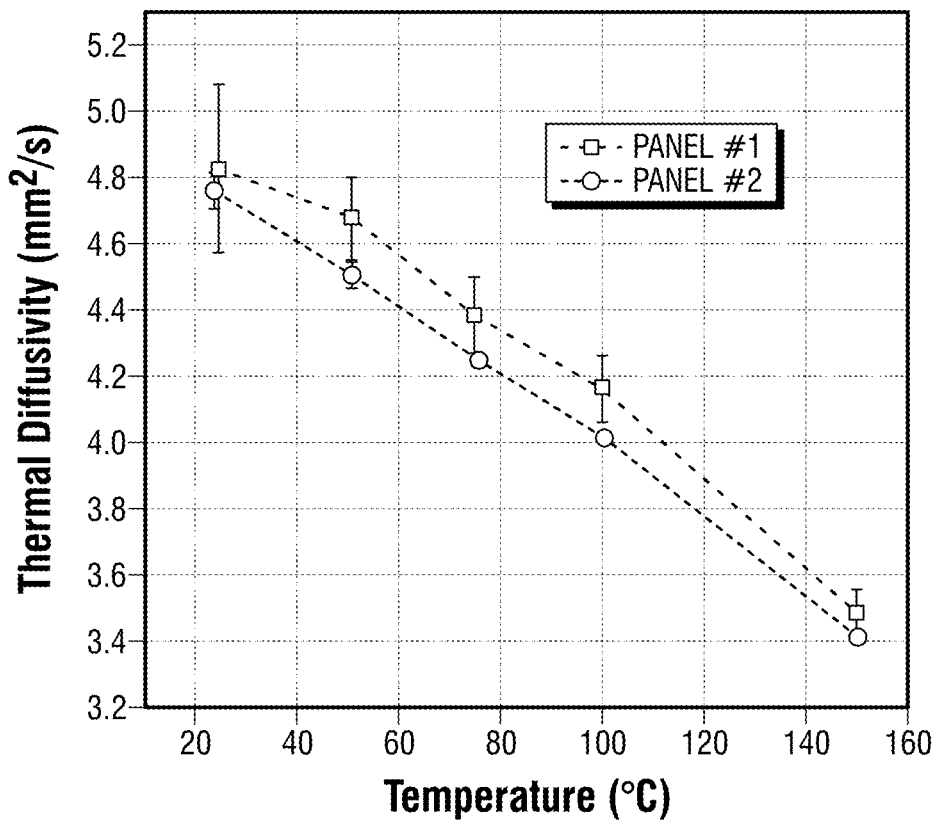
FIG. 14A depicts the thermal diffusivity of [1] a 12"×12" panel having a silver volume percent of about 5% and a carbon fiber volume percent of 55-58% and [2] a 12"×12" panel having a silver volume percent of about 5%, and a carbon fiber volume percent of 52-55%.
Figure 14B:
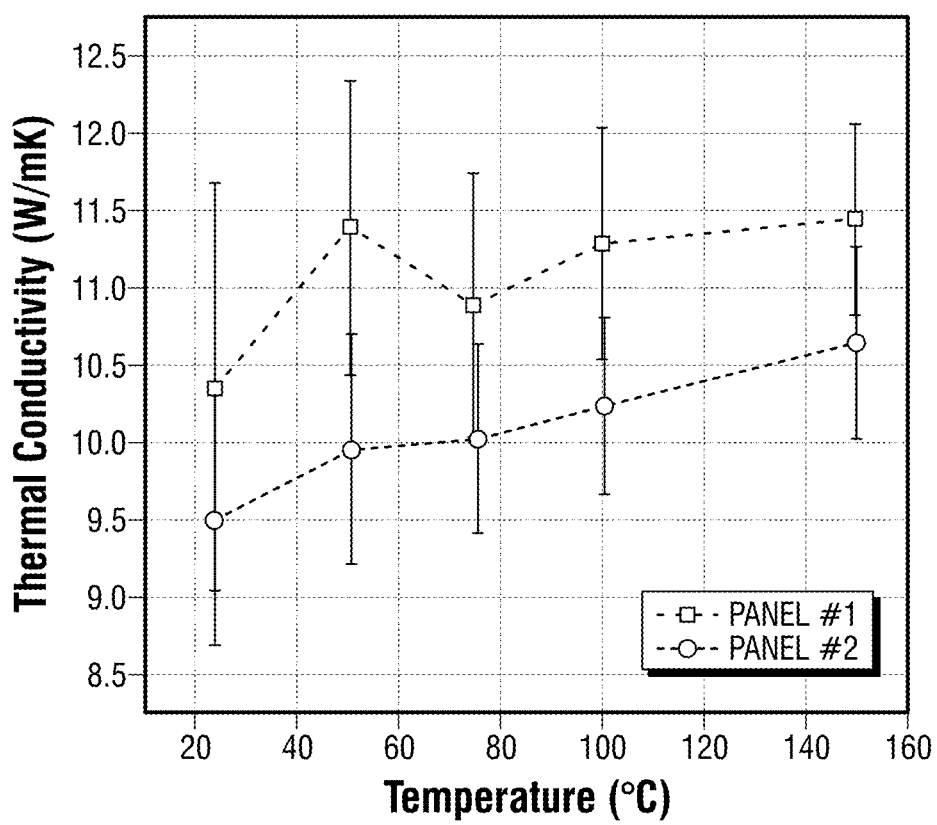
FIG. 14B depicts the thermal conductivity of the panels of FIG. 14A.

Using the techniques described herein, the thermal conductivities of EWC300X, EWC600X, YS95A, and K13C pitch-based graphite fiber host materials were compared to composite materials made by adding nanoscale silver particles and flake shaped microscale silver particles to the host materials. The results, shown at FIGS. 13A and 13B, demonstrated reproducible high thermal conductivity. FIG. 13A depicts the thermal conductivities of the host materials, and FIG. 13B depicts the thermal conductivities of the composite materials.

The aforementioned tests were used to characterize the host materials and composite materials of this example, as shown in Table 2.

TABLE 2

Characterization of Host Materials and Composite Materials

| Sample | Density (g/cm$^3$) | Fiber vol. % | Thermal Conductivity at 25° C. (W/m * K) | Tensile Strength (MPa) | Young's modulus (GPa) |
|---|---|---|---|---|---|
| EWC300X | 1.70 | 58.1 | 1.96 ± 0.20 | 273.0 ± 19.6 | 91.2 ± 5.2 |
| EWC600X | 1.74 | 56.4 | 5.00 ± 0.22 | 103.8 ± 11.5 | 52.9 |
| YS95A | 1.74 | 55.2 | 3.19 ± 0.10 | 248.6 ± 31.0 | 101.8 ± 1.1 |
| K13C | 1.71 | 53.2 | 3.00 ± 0.05 | 358.5 ± 34.0 | 106.9 ± 10.8 |
| EWC300X/Ag | 2.18 | 58.3 | 6.62 ± 0.51 | 154.9 ± 17.9 | 82.2 ± 4.7 |
| EWC600X/Ag | 2.17 | 52.6 | 7.93 ± 0.76 | 134.0 ± 3.3 | 59.5 ± 5.9 |
| YS95A/Ag | 2.10 | 44.8 | 4.54 ± 0.05 | 168.5 ± 5.2 | 72.7 ± 7.7 |
| K13C/Ag | 2.11 | 45.8 | 5.73 ± 0.26 | 238.5 ± 33.1 | 50.3 ± 8.3 |

We claim:

1. A method for making a composite material, the method comprising:
providing a host material,
contacting the host material with microscale metal particles and nanoscale metal particles to associate the host material with an amount of the microscale metal particles and the nanoscale metal particles sufficient to impart the composite material with at least a 0.4 volume % of metal particles, and
sintering the nanoscale metal particles.

2. The method of claim 1, further comprising forming a suspension prior to the contacting of the host material, wherein the suspension comprises a liquid and at least one of the microscale metal particles and the nanoscale metal particles.

3. The method of claim 2, wherein the suspension further comprises a resin.

4. The method of claim 3, wherein the resin comprises an epoxy resin.

5. The method of claim 1, wherein at least one of the microscale metal particles and the nanoscale metal particles comprise silver, copper, aluminum, or a combination thereof.

6. The method of claim 1, wherein the nanoscale metal particles are substantially spherical, and the microscale metal particles are flake shaped.

7. The method of claim 1, wherein the composite material has a through thickness thermal conductivity that is at least 4.0 W(m*K) greater than the through thickness thermal conductivity of the host material.

8. The method of claim 1, wherein the host material comprises a woven or non-woven fabric.

9. A method for making a composite material, the method comprising:
providing a host material comprising a woven or non-woven fabric, the woven or non-woven fabric comprising a plurality of fibers,
contacting the host material with a suspension comprising microscale metal particles, nanoscale metal particles, a liquid, and a resin to [1] deposit at least a portion of the nanoscale metal particles on a surface of the plurality of fibers, and [2] associate the host material with an amount of the microscale metal particles and the nanoscale metal particles sufficient to impart the composite material with at least a 0.4 volume % of metal particles, and
sintering the nanoscale metal particles;
wherein the composite material has a through thickness thermal conductivity that is at least 4.0 W(m*K) greater than the through thickness thermal conductivity of the host material.

10. The method of claim 9, wherein the suspension comprises a weight ratio of nanoscale metal particles to microscale metal particles of about 1:1 to about 1:3.

11. The method of claim 9, wherein the composite material has a through thickness thermal conductivity that is at least 10.0 W(m*K) greater than the through thickness thermal conductivity of the host material.

12. The method of claim 9, wherein the composite material comprises at least a 10.0 volume % of metal particles.

13. The method of claim 9, wherein the host material comprises a carbon fabric.

14. The method of claim 9, wherein the nanoscale metal particles are substantially spherical.

15. The method of claim 14, wherein the nanoscale metal particles comprise silver.

16. The method of claim 9, wherein the microscale metal particles are flake shaped.

17. The method of claim 16, wherein the microscale metal particles comprise silver.

18. The method of claim 17, wherein the microscale metal particles have an average diameter of less than 20 μm.

* * * * *